United States Patent
Rosenberg et al.

(10) Patent No.: US 10,320,856 B2
(45) Date of Patent: Jun. 11, 2019

(54) MANAGING ACCESS TO COMMUNICATION SESSIONS WITH COMMUNICATION IDENTIFIERS OF USERS AND USING CHAT APPLICATIONS

(71) Applicant: Cisco Technology, Inc., San Jose, CA (US)

(72) Inventors: Jonathan Rosenberg, Freehold, NJ (US); Patrick C. Linskey, San Francisco, CA (US); Brenno A. Cantelli, Sunnyvale, CA (US); Jeffrey S. Jones, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 278 days.

(21) Appl. No.: 15/286,755

(22) Filed: Oct. 6, 2016

(65) Prior Publication Data
US 2018/0103073 A1    Apr. 12, 2018

(51) Int. Cl.
*G06F 15/16* (2006.01)
*H04L 29/06* (2006.01)
(Continued)

(52) U.S. Cl.
CPC .......... *H04L 65/1093* (2013.01); *H04L 51/04* (2013.01); *H04L 61/1564* (2013.01);
(Continued)

(58) Field of Classification Search
CPC ............. H04L 65/1093; H04L 12/1813; H04L 51/046; H04L 61/1564; H04L 63/101;
(Continued)

(56) References Cited

U.S. PATENT DOCUMENTS 6,119,147 A    9/2000  Toomey et al.
6,295,550 B1 *  9/2001  Choung ............ G06F 17/30873
                                                   707/E17.111
(Continued)

FOREIGN PATENT DOCUMENTS

GB    2368246 A    4/2002

OTHER PUBLICATIONS

Bowersox, "What is the architecture of a scalable URL shortener?", http://www.quora.com/What-is-the-architecture-of-a-scalable-URL-shortener, Aug. 2014, 3 pages.
(Continued)

*Primary Examiner* — Moustafa M Meky
(74) *Attorney, Agent, or Firm* — Edell, Shapiro & Finnan, LLC

(57) ABSTRACT

A server is configured to provide a service that manages access to communication sessions supported by at least one communication service and to which user devices connect. The service assigns to users registered with the service respective communication identifiers that the users, and unregistered users of the service, use to access the communication sessions via user devices. The service maps each communication identifier to a list of communication sessions, if any, in which the respective user is currently participating and/or is scheduled to participate. The service receives from a user device a join request from a requester. The join request indicates a particular communication identifier of a particular user registered with the service and a requester identifier. The service connects the user device to a communication session, if any, based on the particular communication identifier and the requester identifier.

23 Claims, 15 Drawing Sheets

(51) Int. Cl.
*H04L 29/12* (2006.01)
*H04L 29/08* (2006.01)
*H04L 12/58* (2006.01)

(52) U.S. Cl.
CPC .......... *H04L 63/101* (2013.01); *H04L 63/102* (2013.01); *H04L 65/1073* (2013.01); *H04L 65/403* (2013.01); *H04L 67/141* (2013.01); *H04L 67/146* (2013.01); *H04L 67/02* (2013.01)

(58) Field of Classification Search
CPC . H04L 65/1073; H04L 65/403; H04L 67/141; H04L 67/146; H04L 63/102; H04L 67/02
See application file for complete search history.

(56) References Cited

U.S. PATENT DOCUMENTS

| | | | |
|---|---|---|---|
| 7,664,490 B2 | 2/2010 | Aaby et al. | |
| 7,764,632 B2 | 7/2010 | Gray et al. | |
| 7,876,714 B2 | 1/2011 | Ethier et al. | |
| 8,036,149 B2* | 10/2011 | Nemori | H04W 76/45 370/296 |
| 8,045,489 B2 | 10/2011 | Lee et al. | |
| 8,200,756 B2 | 6/2012 | Karniely | |
| 8,245,141 B1 | 8/2012 | Fuller et al. | |
| 8,286,183 B2 | 10/2012 | Baird et al. | |
| 8,319,816 B1 | 11/2012 | Swanson et al. | |
| 8,346,231 B1 | 1/2013 | Smith et al. | |
| 8,375,132 B2 | 2/2013 | Hernanz | |
| 8,402,091 B2 | 3/2013 | Karniely | |
| 8,464,167 B2* | 6/2013 | Saund | H04L 51/04 715/758 |
| 8,478,622 B2 | 7/2013 | Grodum | |
| 8,713,662 B2 | 4/2014 | Staurnes et al. | |
| 8,732,244 B2 | 5/2014 | Karniely | |
| 8,788,680 B1* | 7/2014 | Naik | H04L 67/306 709/227 |
| 8,824,341 B2* | 9/2014 | Logan | G06Q 10/109 370/260 |
| 8,831,197 B2 | 9/2014 | Prabhune et al. | |
| 8,990,329 B1 | 3/2015 | Khvostichenko et al. | |
| 9,185,229 B2* | 11/2015 | Logan | G06Q 10/109 |
| 9,215,282 B2* | 12/2015 | Naik | H04L 67/306 |
| 9,231,901 B1* | 1/2016 | Cushing | H04L 51/24 |
| 9,667,770 B2* | 5/2017 | Zhidov | H04M 1/72547 |
| 9,819,803 B2* | 11/2017 | Logan | G06Q 10/109 |
| 10,051,105 B2* | 8/2018 | Zhidov | H04M 1/72547 |
| 2005/0058088 A1 | 3/2005 | Decker et al. | |
| 2007/0208806 A1 | 9/2007 | Mordecai et al. | |
| 2009/0013045 A1 | 1/2009 | Maes et al. | |
| 2012/0054836 A1 | 3/2012 | Chien et al. | |
| 2012/0314849 A1 | 12/2012 | LeBlanc et al. | |
| 2013/0018950 A1 | 1/2013 | Narayanan et al. | |
| 2013/0198653 A1* | 8/2013 | Tse | G06F 3/0484 715/751 |
| 2014/0095871 A1 | 4/2014 | Hoard et al. | |
| 2014/0096266 A1 | 4/2014 | Hoard et al. | |
| 2014/0317302 A1* | 10/2014 | Naik | H04L 67/306 709/227 |
| 2017/0041263 A1* | 2/2017 | Shekel | H04L 51/12 |
| 2017/0124518 A1* | 5/2017 | Leske | G06Q 10/1095 |

OTHER PUBLICATIONS

B. Desruisseaux, "Internet Calendaring and Scheduling Core Object Specification (iCalendar)", IETF, Network Working Group, Category: Standards Track, RFC 5545, Sep. 2009, 168 pages.
Stack Overflow, "How to code a URL shortener?", http://stackoverflow.com/questions/742013/how-to-code-a-url-shortener, Aug. 28, 2014, 9 pages.
"Audio Controls Guide and Release Notes for FR29", Conferencing & Collaboration, User Guide, Cisco WebEx, Apr. 2012, 11 pages.
"WebEx Meeting Center User Guide", For Hosts, Presenters, and Participants, Cisco WebEx, www.webex.com, May 2, 2013, 414 pages.
Gatekeeper Software Solutions, LLC, "Prime Virtual Waiting Room", http://www.gatekeeperwebsolutions.com/prime-virtual-waiting-room, Retrieved Nov. 3, 2014, 3 Pages.
International Search Report and Written Opinion in corresponding International Application No. PCT/US2017/044300, dated Oct. 6, 2017, 13 pages.

* cited by examiner

FIG.7

FIG.11 understand # MANAGING ACCESS TO COMMUNICATION SESSIONS WITH COMMUNICATION IDENTIFIERS OF USERS AND USING CHAT APPLICATIONS

TECHNICAL FIELD

The present disclosure relates to managing access to communication sessions.

BACKGROUND

Adding new participants to an existing one-on-one telephone call can be difficult. For example, an existing participant may be required to hit a "conference" button on a local telephone, dial a number associated with adding a new participant, and then hit the conference button again to conference the new participant into the call. This sequence fails if the new participant is not ready to join the call when the sequence is executed. Similarly, adding participants to a web-based meeting can also be difficult for several reasons. First, participants typically need access to a Universal Resource Locator (URL) that uniquely identifies, and is used to join, the web-based meeting, but the URL for the web-based meeting may not be readily available. Second, an "invite" to join a participant to the web-based meeting may need to be sent by a participant in the web-based meeting, which requires that participant to navigate web-pages to find a join meeting option, and then to enter an email address of the participant to be joined.

BRIEF DESCRIPTION OF THE DRAWINGS

FIG. 7 is a user interface screen of an example invitation to a communication session that is presented by a user device to a user and that includes a communication identifier, according to an example embodiment.

FIG. 11 is a user interface screen for the first user after the first user has selected a join option/button to join the second user to a web-based meeting, according to an example embodiment.

DESCRIPTION OF EXAMPLE EMBODIMENTS

Overview

Figure 1:
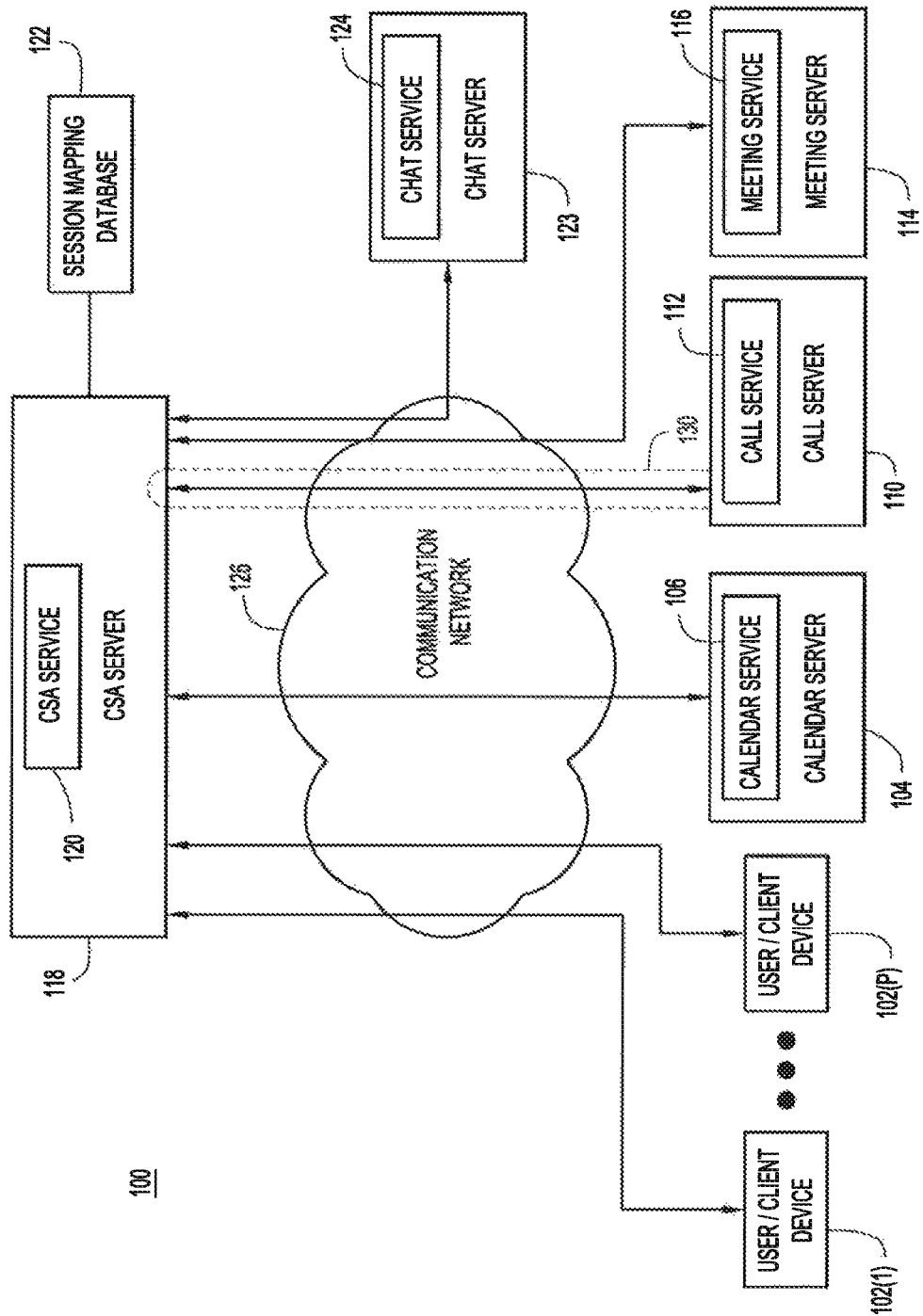
FIG. 1 is a diagram of a network environment in which system and methods for managing access to communication sessions using communication identifiers associated with users of a communication service may be deployed, according to an example embodiment.

In a first embodiment, a server is configured to provide a service that manages access to communication sessions supported by at least one communication service and to which user devices connect. Respective communication identifiers (also referred to as "zip" identifiers) are assigned to registered users, that the users and unregistered users of the service, use to access the communication sessions via user devices. Each communication identifier is mapped to a list of communication sessions, if any, in which the respective user is currently participating and/or is scheduled to participate. A join request from a user device is received from a requester. The join request indicates a particular communication identifier of a particular user registered with the service and a requester identifier. The user device is connected to a communication session, if any, based on the particular communication identifier and the requester identifier.

In a second embodiment, one or more servers are configured to manage access to communication sessions supported by at least one communication service and to which user devices connect. A first user device is connected to a communication session associated with a join link to the communication session. A selectable first join option associated with the join link is generated for display at the first user device. A selection of the first join option is received and responsive thereto, the join link is sent to the second user device and a selectable second join option associated with the join link is generated for display at the second user device. A selection of the second join option including the join link is received from the second user device and, responsive thereto, the second user device is connected to the communication session based on the join link.

Example Embodiments

According to embodiments presented, a communication session access (CSA) service simplifies user access to communication sessions supported by communication services using communication identifiers assigned to users registered with the CSA service. That is, the CSA service assigns to each registered user a unique communication identifier. In one example, the communication identifier may be a mnemonic Hypertext Transfer Protocol (HTTP) Uniform Resource Locator (URL), such as "http://zip.ciscospark.com/ownername," The registered user, "ownername," to which the communication identifier is assigned is referred to as the "owner" of the communication identifier. In another example, the communication identifier may be associated with a telephone number assigned to the user, and may be accessible by dialing the telephone number in combination with a dialed pin number unique to the user to which the communication identifier is assigned, for example. In another example, the communication identifier may be a Session Initiation Protocol (SIP) URI, such as sip:ownername@zip.ciscospark.com. The communication identifier is also referred to herein as a "zip" identifier.

The unique communication identifier assigned to a user "points to" or otherwise indicates all calls and/or web-based meetings (collectively and generically referred to as "communication sessions") in which the user is currently participating and/or scheduled to participate, but does not uniquely identify any specific call or web-based meeting. Similarly, accessing the communications identifier can also create a new meeting with its owner. In this way, the communication identifier can be said to "follow the user around" over time as the user places calls and schedules and joins different web-based meetings. "Calls" and "web-based meetings" will be described in further detail on below.

An example use of a communication identifier is when a user to which the communication identifier is assigned wishes to schedule a web-based meeting. In that case, that user inserts the communication identifier into a calendar invite and sends the calendar invite to intended participants/invitees, who receive the calendar invite. To join the web-based meeting at an appointed time, invitees select, e.g., click on, the communication identifier in their respective calendar invites, which results in the invitees being joined to the web-based meeting. A useful property of the communication identifier is that if the user/owner is in any web-based meeting or call, regardless of whether the user scheduled the web-based meeting or placed/made the call, the communication identifier indicates all of the web-based meetings and/or calls that the user is in, or could be in.

A user is said to be in a call or a web-based meeting if the user is sending/receiving media in that call or web-based meeting (a call or a meeting on hold still counts as sending or receiving media). Some non-limiting examples of when a user is considered to be in a call or a web-based meeting are as follows: the user is participating in a call and has not been put on hold; the user is participating in a call, but has been put on hold; the user is in a scheduled meeting; the user is in an ad-hoc meeting; the user is in a collaboration chat room (such as those provided by Cisco Spark) and someone has started an ad-hoc web-based meeting in the collaboration chat room, however the user has not joined that meeting yet; the user, or someone else, has scheduled a web-based meeting, and that meeting is in progress, however, the user has not yet joined that meeting.

From the perspective of any user, rules for using the communication identifier are straightforward. Non-limiting examples of the rules include the following.

If a user wishes to schedule a web-based meeting, the user accesses a calendar, pastes the communication identifier assigned to the user into a calendar invite, and sends the calendar invite to other individuals. Others can join the scheduled web-based meeting simply by clicking on the communication identifier in their received invites. This works for back-to-back web-based meetings and web-based meetings scheduled in parallel.

If a user wishes to add someone to a web-based meeting or a call, the user sends or otherwise provides that person the communication identifier owned by the user. If the person clicks on the communication identifier, the person will be able to join the web-based meeting. The user may be asked to approve the person before the person is admitted to the web-based meeting or call.

Use of the communication identifiers to control access to communication sessions in the context of a network environment is now described in detail.

Referring first to FIG. 1, a diagram is shown of an example network environment 100 in which embodiments directed to managing access to communication sessions using communication identifiers associated with users may be deployed. Environment 100 includes multiple user/client devices 102(1)-102(P) (also referred to as user devices 102) operated by respective users (not specifically shown in FIG. 1), a calendar server 104 to host a calendar service 106, a call server 110 to host a call service 112, a meeting server 114 to host a web-based meeting service 116, a communication session access (CSA) server 118 to host a CSA service 120 that interfaces with a session mapping database 122, a chat server 123 to host a messaging or chat service 124, and a communication network 126 over which the user devices, and aforementioned servers/services communicate. Communication network 112 may be any one or more of a wired or wireless local area networks (LANs) and wired or wireless wide area network (WANs), including the Internet and the Public Switched Telephone Network (PSTN). Communication network 112 may support a variety of data protocols, including without limitations, Session Initiation Protocol (SIP), HTTP, Real-time Transport Protocol (RTP), and also circuit switch protocols. While FIG. 1 shows single servers to host respective ones of services 106, 112, 116, 120, and 124, it is to be understood that each service may be distributed across many geographically dispersed servers, and there may be many instances of each service. Also, various ones of the servers and services may be integrated together/combined. For example, CSA service 120 and meeting service 116 may integrated into a single application service hosted on a server.

Call service 112 and meeting service 116 are examples of respective communication services that support/manage respective communication sessions to which one or more of user devices 102 connect to communicate with each other. Call service 112 supports/manages communication sessions as "calls" between various ones of user devices 102 connected to the call service over communication network 126. The calls include, but are not limited to, voice-only calls, multimedia (voice, audio, image, and data) calls, voice-over-Internet Protocol (IP) calls, and so on. Call service 112 and CSA service 120 may use computer telephony integration (CTI) to exchange call control information with each other. CSA service 120 accesses the call control information to learn of calls that are in-progress and identities of parties connected to the calls, and stores the information in session mapping database 122. The identities of the parties may include identifiers for user devices 102 and personal identifiers of the users. In addition, call trunks 130 carrying the calls may be looped between call service 112 and CSA service 120 to enable the CSA service to add new callers into the looped calls via call controls accessible to the CSA service 120.

Meeting service 116 supports/manages communication sessions as web-based meetings between various ones of user devices 102 connected to the meeting service over communication network 126. In general, a web-based meeting (also referred to as an "online" meeting) is a meeting that is conducted over the Internet, for example, and managed by meeting service 116 that presents web-pages to each user device connected to the same meeting to mimic a collaborative environment in which users can converse in audio, video and electronically share documents and other data in real-time. Web-based meetings may include personal meeting rooms, collaboration meeting rooms, and so on. Meeting service 116 and CSA service 120 may communicate with each other using web-based meeting application program interfaces (APIs) hosted on servers 114 and 118. Using the APIs, CSA service 120 accesses web-based meeting information to learn of meetings that are in-progress and identities of parties connected to the web-based meetings, and stores the information in session mapping database 122. CSA service 120 may also use the APIs to create and add users to web-based meetings.

Calendar service 106 interacts with user devices 102 to enable users of the user devices to schedule calls and web-based meetings with each other, and the calendar service generates scheduling information for all such scheduled communication sessions. As an example, calendar service 106 may be by embodied by Microsoft Exchange® or other similar calendar server software now known or hereinafter developed. Calendar service 106 may also implement calendar fusion technologies. Calendar fusion technologies leverage server-side calendar integrations using calendaring application programming interfaces (APIs), such as Exchange Web Services (EWS). Such server-side calendar integrations allow applications to have full access to the calendars of users (e.g., users of user devices 102). This means the server-side calendar integrations have access to scheduled communication sessions and, for each scheduled communication session, scheduling information including, email addresses of participants invited to the session, a list of attendees to whom an invitation to the communication session was forwarded, a list of recipients of the forwarded invitation and who accepted and declined the forwarded invitation, and start and stop times of the session. CSA service 120 accesses the scheduling information generated by calendar service 106 and stores the information in session mapping database 122 in association with the information accessed from call service 112 and meeting service 116. In another embodiment, a plugin may be installed into the calendar application on the user device 102(1), which communicates directly with the CSA service 120. As the user schedules or changes meetings, the client plugin communicates this information to the CSA.

Chat service 124 hosts instant messaging (IM, or chat) applications that user devices 102 may invoke to enable users of the user devices to engage in chat sessions or enter chat rooms with each other. The chat rooms may be 1-1 or 1-Many, for example. Chat service 124 communicates, and shares information, with CSA service 120 to provide the users of user devices 102 with convenient access to communication sessions managed by the CSA service, as will be described below. The chat service 124 may be one service or application that is part of a broader collaboration service from which users can engage in chat sessions, initiate voice calls, initiate video calls, upload documents to a shared workspace, and initiate web-based meetings. Thus, in the example of FIG. 1, CSA service 120 and chat service 124 are shown as separate entities; however, it is understood that the chat service may be integrated or combined with the CSA service.

User devices 102 may each take on a variety of forms, including a landline telephone, SmartPhone, tablet, laptop computer, desktop computer, video conference endpoint, and the like. User devices 102 may each host a call application used to make calls from the user device, a calendar application such as Microsoft Outlook® software application and Outlook plugins, and a web-based conference client application that communicates with the calendar application. Users of user devices 102 may use the calendar applications to schedule communication sessions into a user calendar at a date and time in the future. The calendar applications are capable of scheduling an appointment and sending an invitation to users, i.e., other user devices, as well as receiving an invitation from other users. When a user accepts a calendar invitation, the calendar application stores information for the communication session. Calendar service 106 interacts with the calendar applications of user devices 102 to access communication session information stored by the calendar applications, and then compiles that information into communication session records accessible to CSA service 120. In an example, communication session information compiled by calendar service 106 for a given web-based meeting may include all, or a subset of, the following items: a unique identifier for the meeting; an identifier of a host of the meeting; a list of invitees (i.e., invitee identifiers) to the meeting; and a start time and an end time of the meeting. The identifier of the host and each invitee identifier may each include one or more of a name and an email address, for example.

In accordance with embodiments presented herein, CSA service 120 controls user accesses to communication sessions supported by call service 112 and meeting service 116, both ad-hoc and ones scheduled with calendar service 106. More specifically, CSA service 120 starts communication sessions for users and adds users to communication sessions already in-progress in a way that is convenient and straight forward for the users through the use of communication or "zip" identifiers, as discussed briefly above. In one embodiment, chat service 124 interoperates with CSA service 120 to provide users with easy access to communication sessions, as will be described below.

Figure 2:
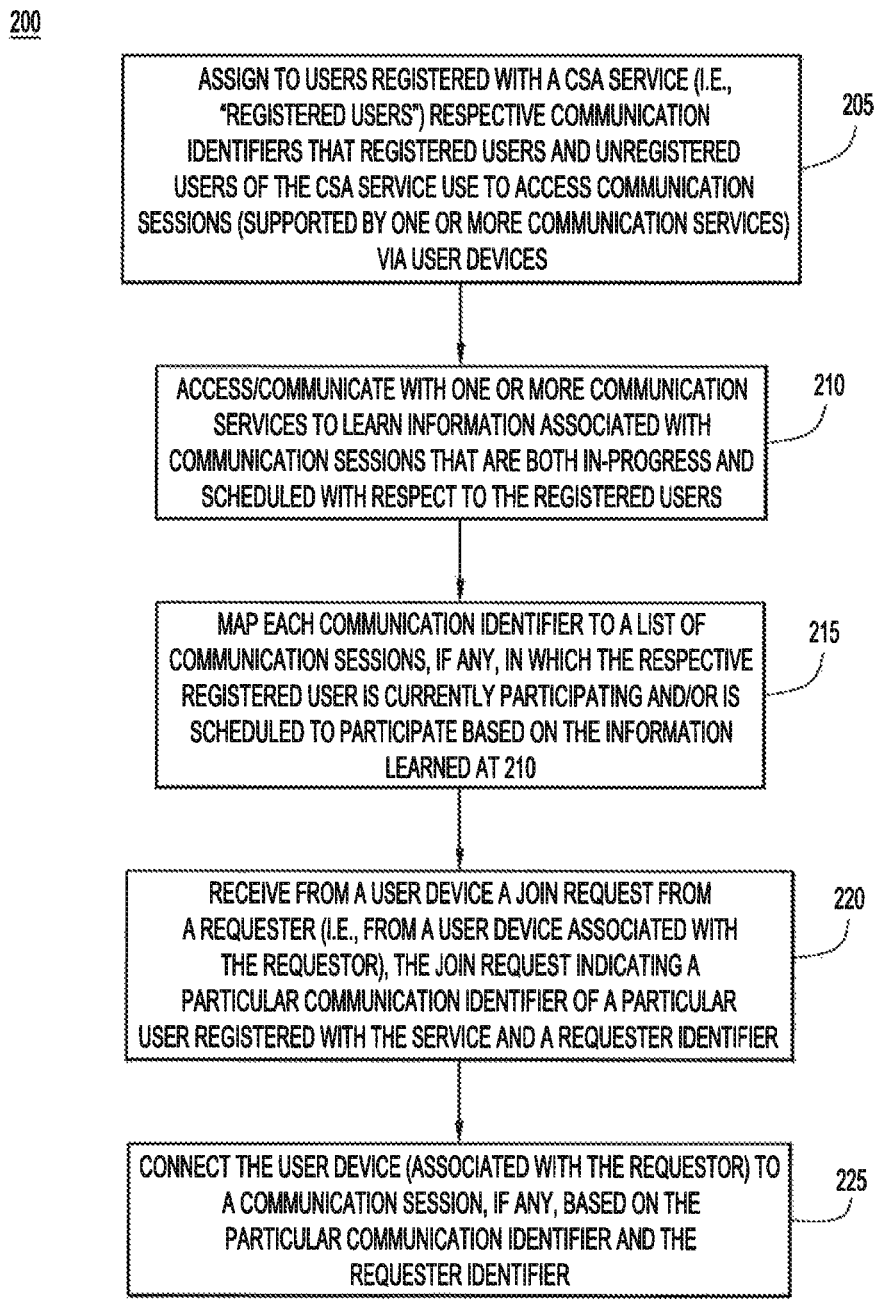
FIG. 2 is a flowchart of a method of controlling/managing user access to communication sessions performed by a communication session access service of FIG. 1, according to an example embodiment.

With reference to FIG. 2, there is a flowchart of an example method 200 of controlling/managing user access to communication sessions performed by CSA service 120. The communication sessions include calls and web-based meetings supported by call service 112 and meeting service 116, respectively, to which user devices 102 connect.

At 205, CSA service 120 assigns to users registered with the CSA service (i.e., "registered users") respective communication identifiers that both registered users and unregistered users of the CSA service may use to access the CSA service through user devices 102. More specifically, using the communication identifiers, users of CSA service 120 may start communication sessions and/or add other users to communication sessions already in-progress in a way that is convenient and straight forward for the users. Each communication identifier is configured to be entered by or acquired from a user via user devices 102, and communicated from the user devices to CSA service 120 or other user devices over communication network 126. CSA service 126 also associates each communication identifier with a personal identifier of the registered user to which the communication identifier is assigned. Thus, CSA service 126 records, for each registered user thereof, the respective communication identifier and the personal identifier associated with the communication identifier.

In one example, the communication identifier may be a mnemonic HTTP URL, such as "http://zip.ciscospark.com/ownername." The registered user, "ownername," to which the communication identifier is assigned is referred to as the "owner" of the communication identifier. In another example, the communication identifier may be similar to a telephone number assigned to the user or may be accessible through the use of a telephone number in combination with a dialed pin number, for example. As described below, the unique communication identifier assigned to a user indicates/points to all communication sessions in which the user is currently participating and/or scheduled to participate, but does not uniquely identify any specific call or web-based meeting.

At 210, CSA service 120 accesses/communicates with (i) call service 112 to learn of calls that are in-progress and identities of parties connected to the calls, (ii) meeting service 116 to learn of web-based meetings that are in-progress and identities of parties connected to the in-progress meetings, and (iii) calendar service 106 to learn of scheduled calls and web-based meetings and information associated with the scheduled calls and web-based meetings. CSA service 120 stores the information accessed in (i), (ii), and (iii) in session mapping database 122 in connection with the assigned communication identifiers, as described below in connection with operation 215.

At 215, based on the information accessed at 210, CSA service 120 maps each communication identifier directly or indirectly to a corresponding list of communication sessions, if any, that the registered user to which the communication identifier is assigned is currently participating and/or is scheduled to participate. The mappings are stored in session mapping database 122, for example. In one example, the communication identifier directly points to the corresponding list of communication sessions. In another example, the personal identifier associated with the communication identifier directly points to the corresponding list of communication sessions.

To join a communication session, a user sends, from one of user devices 102 to CSA service 120 over communication network 126, a join request to join the communication session. The join request indicates, e.g., includes, a particular communication identifier of a particular user registered with the service. The join request also indicates a personal identifier of the user that sent the join request. In an example, an email address of the user may be used as the personal identifier, although other types of personal identifiers may be used. In the ensuing description, the user that sent the join request may be referred to as a "requester" and the user device from which the join request is sent may be referred to as the "user device associated with the requester" or the "requester user device."

In an example, to send the join request from the user device associated with requester, the requester may click on the communication identifier when presented by that user device in a selectable form in a meeting invite. In response, that user device creates and then sends the join request to CSA service 118 based on the communication identifier (e.g., the communication identifier directs the join request to the CSA service). In this case, the communication identifier may be considered a meeting join link; however the join link does not identify any specific communication session, rather, it may indicate many different communication sessions associated with the particular user to which the particular communication identifier is assigned. In an example, the join request may include a cookie that indicates the requester identifier, e.g., an email address of the requester, and that was previously assigned to the requester by CSA service 122. The cookie could have been previously stored on the user device associated with the requester.

At 220, CSA service 120 receives from the user device associated with the requester the join request indicating (i) the particular communication identifier of the particular user registered with the service, and (ii) the requester identifier.

At 225, CSA service 120 connects the user device associated with the requester to a communication session, if any, based on the particular communication identifier and the requester identifier. To do this, CSA service 120 (i) examines the list of communication sessions mapped to/indicated by the particular communication identifier; (ii) compares the requester identifier to a particular user identifier indicated by the particular communication identifier; and (iii) connects the user device to a communication session, if any, based on the results of the examine and the compare operations. In an example, the particular user identifier may be an email address of the particular user, although other personal identifiers may be used.

Figure 3:
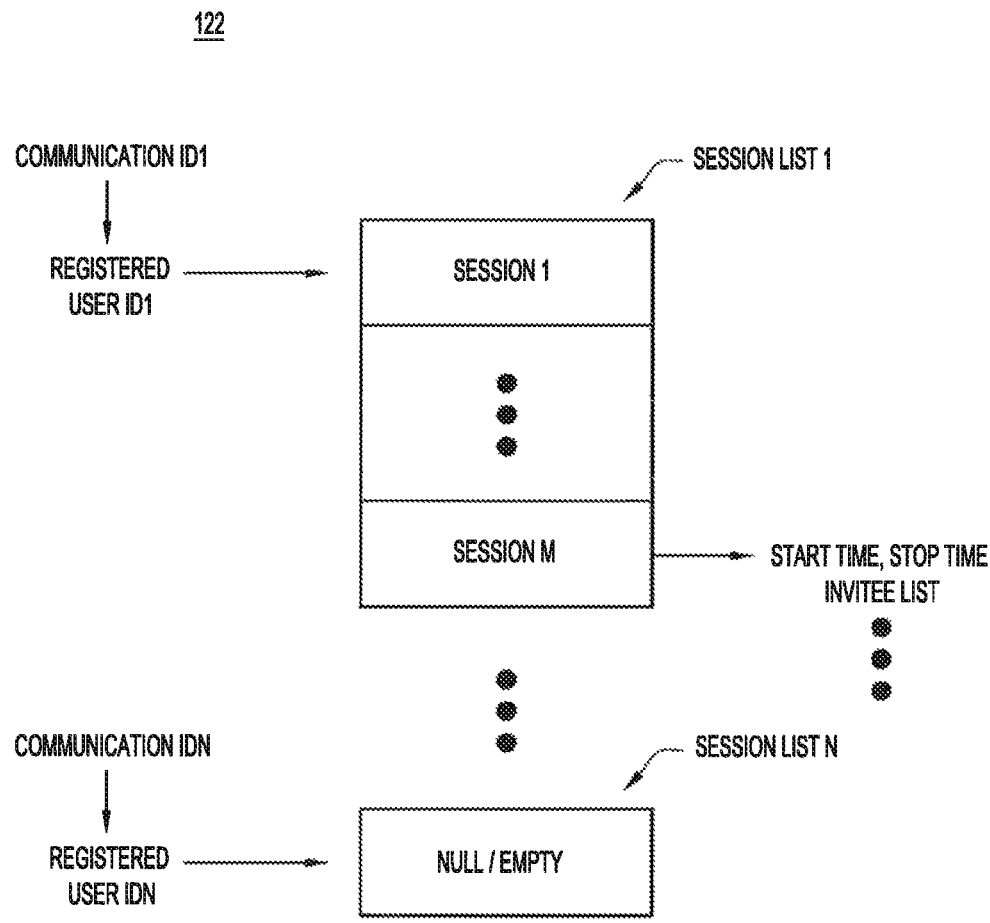
FIG. 3 is an illustration of a session mapping database used to assist with managing access to communication sessions, according to an example embodiment.

With reference to FIG. 3, there is an illustration of an example of session mapping database 122. Database 122 includes communication session lists 1-N (referred to as "session lists 1-N") each for a corresponding one of communication identifiers (IDs) 1-N and associated ones of registered user IDs 1-N (e.g., respective email addresses of the registered users), which may be mapped to corresponding ones of the communication identifiers. CSA service 120 compiles session lists 1-N in operations 210 and 215, described above. Either communication IDs 1-N or registered user IDs 1-N may be used as indexes to corresponding ones of session lists 1-N. Each of session lists 1-N includes a list of the communication sessions (e.g., calls and web-based meetings), if any, that the registered user to which the communication identifier is assigned is currently participating and/or is scheduled to participate. For example, session list 1 indicates that registered user 1 is currently participating in or scheduled to participate in multiple communication sessions 1-M. In another example, session list N indicates that registered user N is not participating in or scheduled to participate in any call, thus, session list N is an empty/null list.

Information/entries for each of communication sessions 1-M may take different forms depending on the type of communication session to which the entry applies, such as a web-based meeting or a call. For example, an entry for a web-based meeting may include a host ID of the host of the meeting, such as a hostname and a host email address, start and stop times, and a list of invitees (i.e., a list of participants invited to the meeting). The list of invitees/participants may include identifiers of each invitee, e.g., a name and an email address of each invitee. An entry for a call, which may include a scheduled call, or a call that is in progress, may include information similar to that for a web-based meeting, or a subset of that information. For example, an entry for a call may include a telephone number, identities of parties in the call (e.g., a participants list to the call), and so on.

Returning back to FIG. 2, CSA service 120 implements various logic flows at operation 225 to control user access to communication sessions (referred to more simply as "sessions") depending on whether the session list mapped to the communication identifier indicates that there are no sessions (i.e., the list is an empty/null list), there is only one session, or there are multiple sessions. The various logic flows are now described in connection with FIGS. 4-6, each of which expands on operation 225. In each of FIGS. 4-6, the term "user device" refers to the user device from which the join request was sent.

Figure 4:
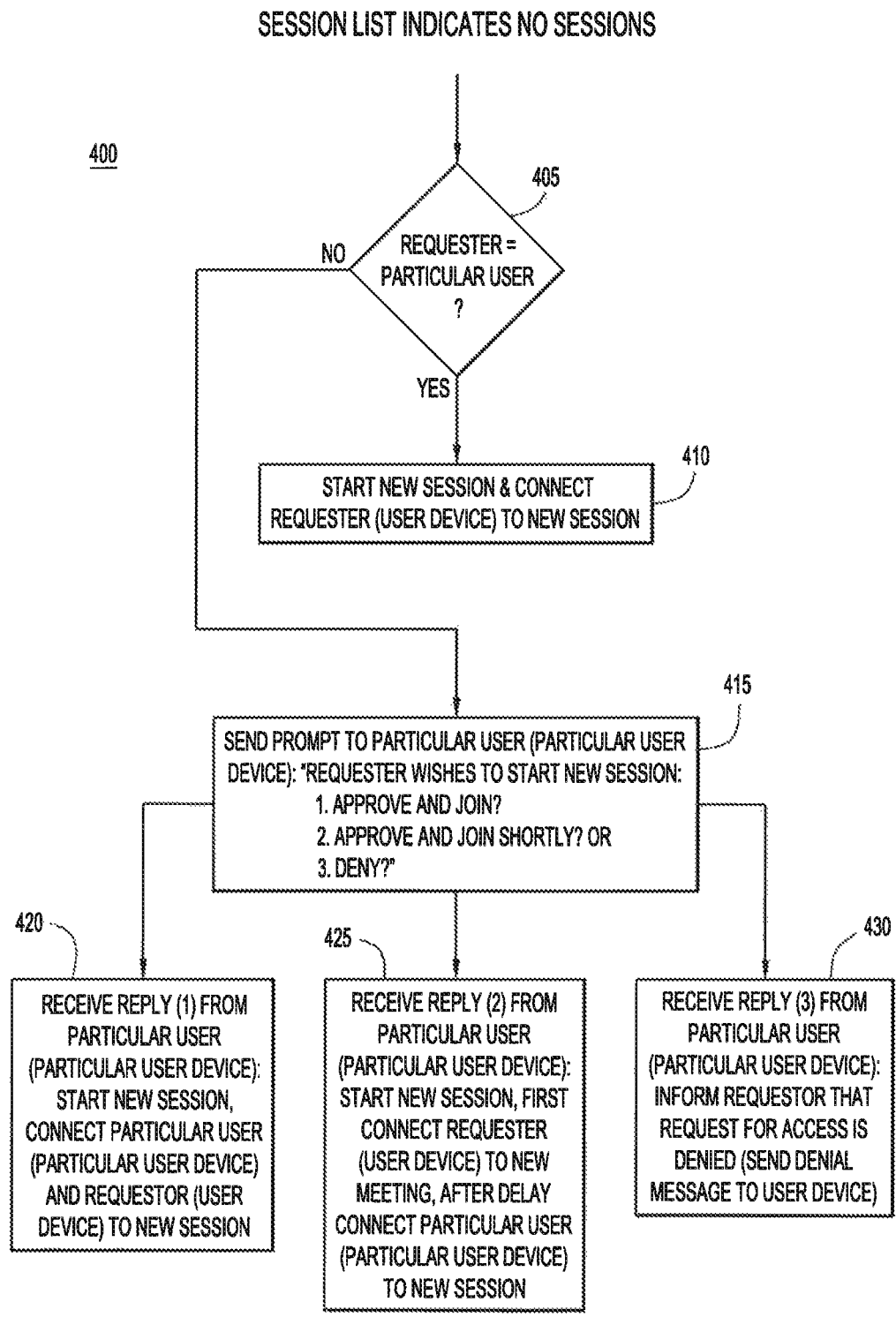
FIG. 4 shows operations for controlling user access to communication sessions in a case where a session list accessed in the method of FIG. 2 indicates there are no in-progress or scheduled sessions, according to an example embodiment.

With reference to FIG. 4, there are shown operations 400 for controlling user access to sessions in a case where the session list accessed at operation 225 indicates there are no in-progress or scheduled sessions, i.e., the session list is empty.

At 405, CSA service 120 determines whether the requester identifier is the same as the particular user identifier (i.e., the requester is the same as the particular user (i.e., registered user) indicated by the communication identifier). If yes, flow proceeds to 410 and, if no, flow proceeds to 415.

At 410, CSA service 120 starts a new session (i.e., causes a new session to be started) and connects the user device associated with the requester/particular user to the new session (i.e., connects the user device from which the join request was received at 220). To do this, CSA service 120 communicates with the other servers/services (call server/service 110/112 or meeting server/service 114/116) as necessary to start the new session.

At 415, CSA service 120 sends a prompt to the user device associated with the particular user. The prompt seeks approval of the join request by the particular user. For example, at the user device of the particular user, the prompt may be a web page dialog box that presents selectable options (1)-(3), as follows:

"Requester <requester identifier> wishes to start a new session:
1. Approve and Join?
2. Approve and Join Shortly? or
3. Deny?"

Responsive to a selection of one of options (1)-(3) at the user device associated with the particular user, that user device of the particular user sends a corresponding reply to CSA service 120 over communication network 126, and the CSA service receives the reply. CSA service 120 performs one of the following operations 420-430 depending on which of options (1)-(3) is indicated in the reply received at the CSA service, respectively.

At 420, if the reply indicates that option (1) was selected, CSA service 120 (i) communicates with the other servers/services (call server/service 110/112 or meeting server/service 114/116) as necessary to start a new session, (ii) connects the user device associated with the requester to the new session, and without delay, (iii) connects the user device associated with the particular user to the new session.

At 425, if the reply indicates that option (2) was selected, CSA service 120 (i) communicates with the other servers/services (call server/service 110/112 or meeting server/service 114/116) as necessary to start a new session, (ii) connects the user device associated with the requester to the new session, and after a predetermined delay (e.g., a delay of 3 to 10 seconds), (iii) connects the user device associated with the particular user to the new session.

At 430, if the reply indicates that option (3) was selected, CSA service 120 informs the requester that the request for access is denied, i.e., the CSA service 120 sends a message to the user device associated with the requester that causes that user device to present a denial of the join request.

Figure 5:
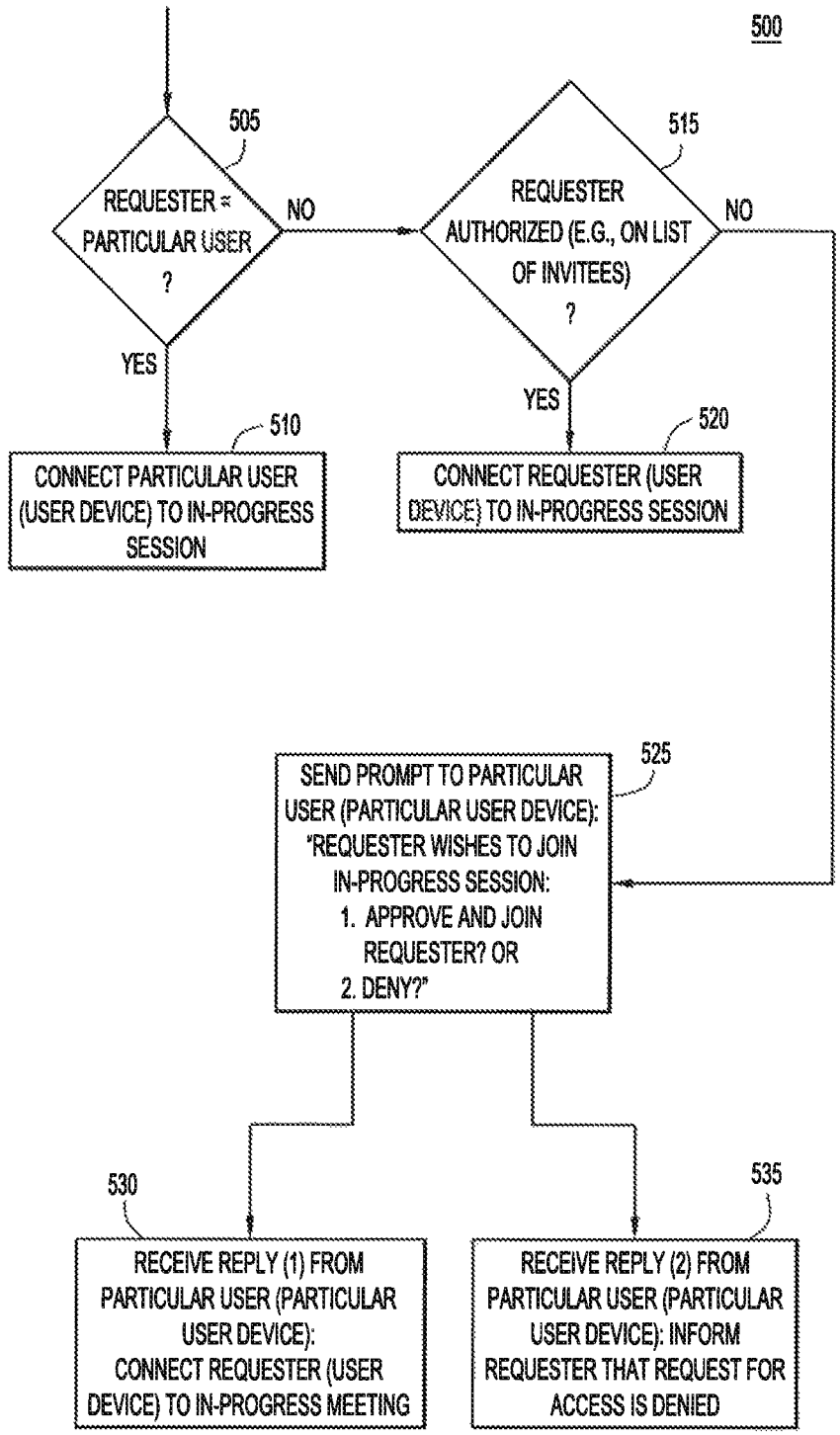
FIG. 5 shows operations for controlling user access to communication sessions in a case where the session list indicates there is only one session, according to an example embodiment.

With reference to FIG. 5, there are shown operations 500 for controlling user access to sessions in a case where the session list accessed at operation 225 indicates there is only one session, and the one session is in-progress.

At 505, CSA service 120 determines whether the requester identifier is the same as the particular user identifier (i.e., if the requester is the same as the particular user indicated by the communication identifier). If yes, flow proceeds to 510 and, if no, flow proceeds to 515.

At 510, CSA service 120 connects the user device associated with the requester/particular user to the session (i.e., connect the user device from which the join request was received at 220).

At 515, CSA service 120 determines whether the requester is authorized for the session that is indicated in the session list. For example, if the session is a web-based meeting, CSA service 120 accesses a list of invitees for the session, and compares the requester identifier to the list of invitees. The requester is authorized for the session if the compare indicates the requester identifier is on the list of invitees. In another example of a web-based meeting, the list of invitees is replaced with a participants list. In yet another example, if the session is a call, a call participant list acts as the authorization list to be compared against the requester identifier, in which case the requester is authorized for the session if the requester identifier is on the call participant list. If the requester is authorized, flow proceeds to 520 and, if the requester is not authorized, flow proceeds to 525.

At 520, CSA service 120 connects the user device associated with the requester to the session.

Operations 505-520 provide an easy "move call" or "join my meeting from here" feature. Consider an example in which a user is on a call on a Smartphone and would like to take a call from a nearby computer. The user simply types into the computer the communication identifier assigned to the user and, as a result, the user will automatically be joined into the call or meeting in-progress.

At 525, CSA service 120 sends a prompt to the user device associated with the particular user. The prompt seeks approval of the join request from the particular user. For example, CSA service 120 sends a prompt, in a web page dialog box, to the user device of the particular user with selectable options (1) and (2), as follows:

"Requester <requester identifier> wishes to join an in-progress session:
1. Approve and Join? or
2. Deny?"

Responsive to a selection of one of options (1) or (2) at the user device of the particular user, that user device sends a corresponding reply to CSA service 120 over communication network 126, and the CSA service receives the reply. Responsive to receipt of the reply at CSA service 120, the CSA service performs one of the following operations 530 and 535 depending on which of options (1) and (2) is indicated as being selected in the reply, respectively.

At 530, if the reply indicates that option (1) was selected, CSA service 120 connects the user device associated with the requester to the session.

At 535, if the reply indicates that option (2) was selected, CSA service 120 informs the requester that the request for access is denied, i.e., the CSA service sends a message to the user device associated with the requester that causes that user device to present a denial message.

Figure 6:
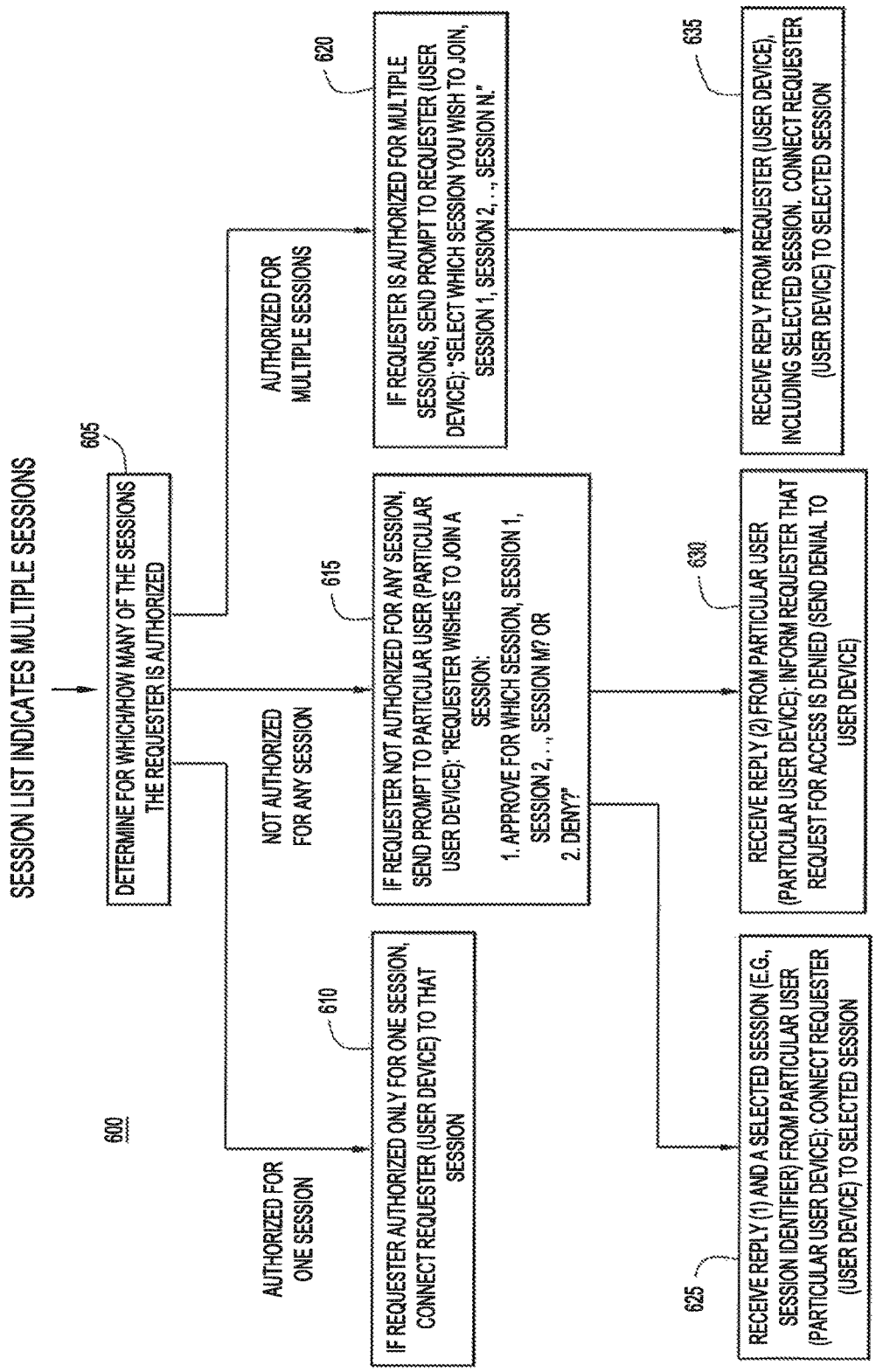
FIG. 6 shows operations for controlling user access to communication sessions in a case where the session list indicates there are multiple sessions, according to an example embodiment.

With reference to FIG. 6, there are shown operations 600 for controlling user access to sessions in a case where the session list accessed at operation 225 indicates there are multiple sessions.

At 605, CSA service 120 determines for which and how many of the multiple sessions the requester is authorized. To do this, CSA service 120 may compare the requester identifier against the invitee list for each of the multiple sessions. If the comparing indicates the requester is authorized to attend only one session among the multiple sessions, flow proceeds to operation 610. If the comparing indicates the requester is not authorized to attend any session, flow proceeds to operation 615. If the comparing indicates the requester is authorized to attend multiple sessions, flow proceeds to operation 620.

At 610, CSA service 120 connects the user device associated with the requester to the one session for which the requester is authorized.

At 615, CSA service 120 sends a prompt, for example, a web page dialog box, to the user device of the particular user with selectable options (1) and (2), where option (1) also lists selectable identifiers of session for which the requester is authorized (e.g., session 1, session 2, . . . , session M), as follows:

"Requester <requester identifier> wishes to join a session:
1. Approve for which session 1, session 2, . . , session. M? or
2. Deny?"

Responsive to a selection of one of options (1) or (2) at the user device of the particular user, that user device sends a corresponding reply to CSA service 120 over communication network 126, and the CSA service receives the reply. Responsive to receipt of the reply at CSA service 120, the CSA service performs one of the following operations 625 and 630 depending on which of options (1) and (2) is indicated as being selected in the reply, respectively.

At 630, if the reply indicates that option (1) was selected along with one of the multiple identified sessions for which the requester is authorized, CSA service 120 connects the user device associated with the requester to the selected session.

At 635, if the reply indicates that option (2) was selected, CSA service 120 informs the requester that the request for access is denied, i.e., the CSA service 120 sends a message to the user device associated with the requester that causes that user device to present a denial of the join request.

At 620, CSA service 120 sends a prompt to the user device associated with the requester including selectable identifiers of sessions for which the requester is authorized, as follows: "Select which session you wish to join, session 1, session 2, . . . , session M."

At 635, upon receiving a reply from the user device associated with the requester and that indicates a selected one of the identifiers of the sessions, CSA service 120 connects the user device associated with the requester the selected one of the sessions (i.e., the session identified by the selected identifier).

Figure 7:
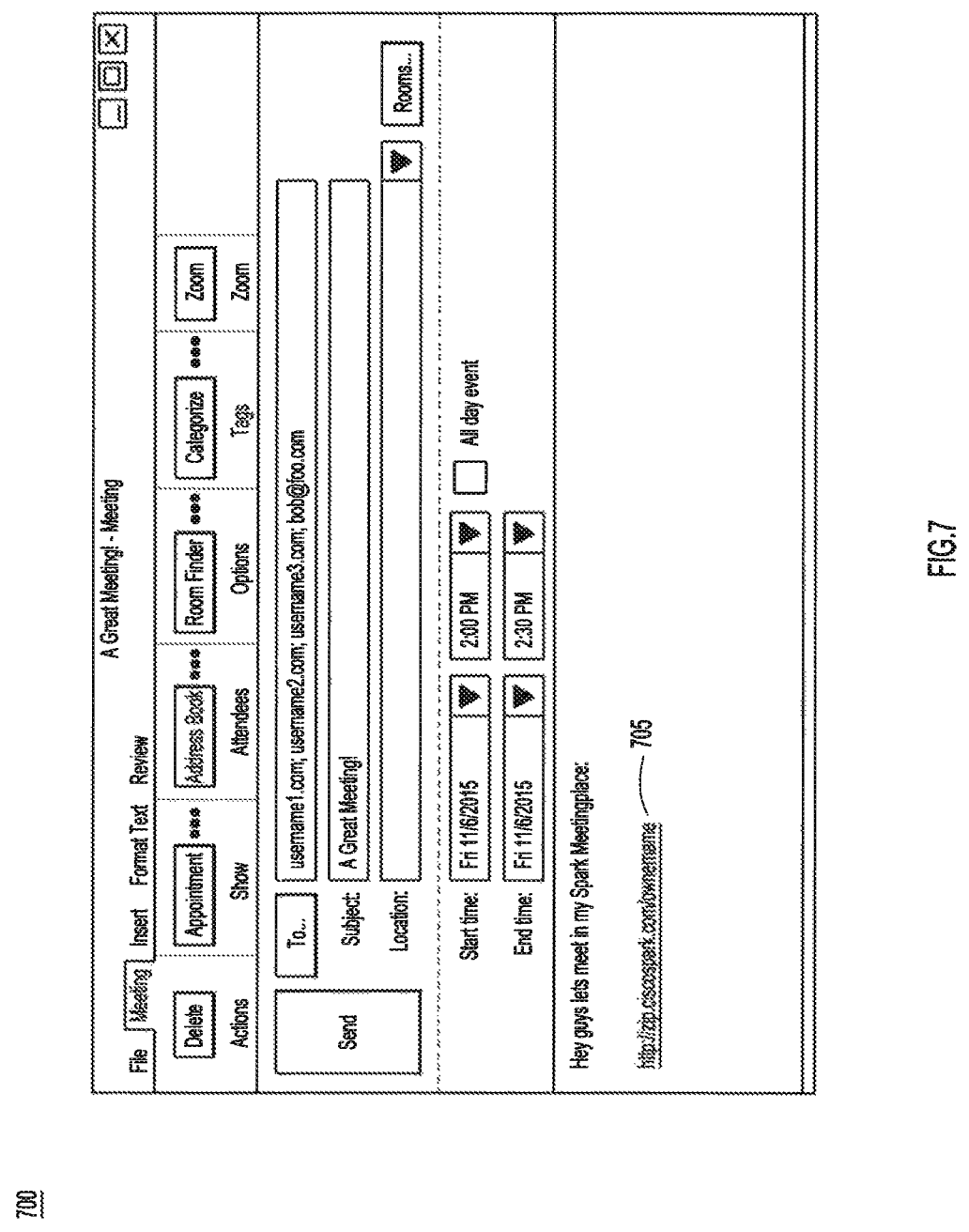

With reference to FIG. 7, there is shown a user interface screen of an example invitation 700 to a communication session that is presented by a user device to a user prior to operation 220 shown in FIG. 2. Invitation 700 includes a communication or "zip" identifier "http://zip.ciscospark.com/ownername" 705 assigned to a registered user "ownername" of CSA service 120 that, when clicked, causes the user device to send to the CSA service a join request for a user to join any of the calls and/or web-based meetings in the list of meetings for "ownername" stored in database 122 as indicated by the communication identifier. The invitation is sent to email addresses for username1-username3, and bob@foo.com. Adding people to a 1-1 phone call, is something very few people can easily do. You have to hit "coup" then dial a number, hit "conf" to conference them in. Hard to do correctly, and it fails if the other person is not ready to join your call right now, but would be in a minute or two.

In summary, users are assigned unique communication or "zip" identifiers. Each communication identifier indicates all of the web-based meetings and calls the user to which the communication identifier is assigned is or could be (e.g., is scheduled to be) in. This feature makes it easy to add others to the meetings or calls; e.g., the others simply click on the communication identifier. When a person clicks on the communication identifier, a join request is sent to a CSA service. The CSA service determines if the person who clicked on the communication identifier is supposed to be in (i.e., is authorized for) the call or meeting. If yes, the person is admitted. If no, the owner of the communication identifier is prompted to admit the person into the appropriate call or meeting.

The communication identifier is not a unique URL for a meeting, i.e., each meeting does not have a unique URL; rather, every meeting in essence has multiple URLs that point to the meeting—one URL for each participant who is in, or could be in, that meeting. This makes it easy to add people to any meeting or call—the 'adder' only needs to know his or her on communication identifier, not the communication identifier of the user that scheduled or started the meeting. Accessing communication sessions based on the communication identifier is fundamentally an indirection process, which layers the communication identifier on top of existing unique meeting identifiers (e.g., an iCal user identifier) and SIP dialog identifier or other call identifiers. The communication identifier can be thought of as a telephone number, but instead of ringing the user that owns the telephone number, the telephone number rings the meeting or call the owner of the telephone number is in.

There are numerous advantages to the system and methods presented herein. People never wait for more than a few seconds to go into a meeting. For scheduled meetings, they go right into the meeting without having to wait for the host. The CSA service ensures that a user goes into the correct meeting through a combination of authorization lists and context combined with modal dialogs sent to the owner of the communication identifier. Adding someone to a meeting is easy, and involves sending or otherwise providing them with the communication identifier of a user. The types of sessions simplify to scheduled meetings, ad-hoc meetings, and calls. A user can be in an ad-hoc call on a desk phone, and to add another person, the user can simply email/Instant Message/tell the person the communication identifier of the user. If the person clicks on it, the modal dialog described above would render on the desk phone. According to the embodiments presented herein, multiple communication identifiers may be bound to each meeting—one for each participant, rather than having a single unique identifier to identify a meeting. Use of the communication identifiers may avoid complications that arise from collaboration room lobbies.

An embodiment that provides an easy and convenient way to add users to communication sessions is described below in connection with FIGS. 8-14. The embodiment may be used in conjunction with or, alternatively, independently of, the embodiments described above. Adding a user to communications sessions, e.g., web-based meetings or calls, can be inconvenient using conventional techniques. For example, adding a user to a web-based meeting may require locating a web-based meeting URL that must be provided to the user to be added, or may require that the user be invited from within the web-based meeting using an invite option, which requires navigating to this option, and then entering an email address of the user to be added. In the embodiments described above, a user may be added to a communication session by sending a communication identifier to the user. The embodiment described below provides an easier and more intuitive way for the user to be added to the web-based meeting or call without requiring users to have direct knowledge of a communication identifier/URL for the communication session.

This embodiment is based on contextual knowledge of the fact that a user is participating in a communication session, i.e., a user device associated with the user is connected to the communication session. A common use case is a chat application (that may be part of a more comprehensive collaboration application, such as Cisco Systems' Spark™ service) by which a user can communicate to others a desire to have the others join a communication session (e.g., a voice call, video call, web-based meeting, etc.) in which the first user is a participant. In this embodiment, the chat service 124 is connected with CSA service 120, and the CSA service 120 is aware of communication sessions in which users are participating. Thus, the CSA service 120 is able to leverage this awareness to simplify adding users connected with the chat applications to the communication sessions.

An example in which a first user named "Carol" adds a second user "Dan" to a communication session is described below in connection with FIGS. 8-13. Then, a flowchart of a corresponding method is described in connection with FIG. 14.

Assume a first user Carol is in a web-based meeting named "Coolness" (i.e., a first user device associated with Carol is connected to the web-based meeting Coolness), and Carol would like to add a second user Dan to the web-based meeting (i.e., connect a second user device associated with Dan to the web-based meeting Coolness). Dan is not currently in the web-based meeting Coolness.

Figure 8:
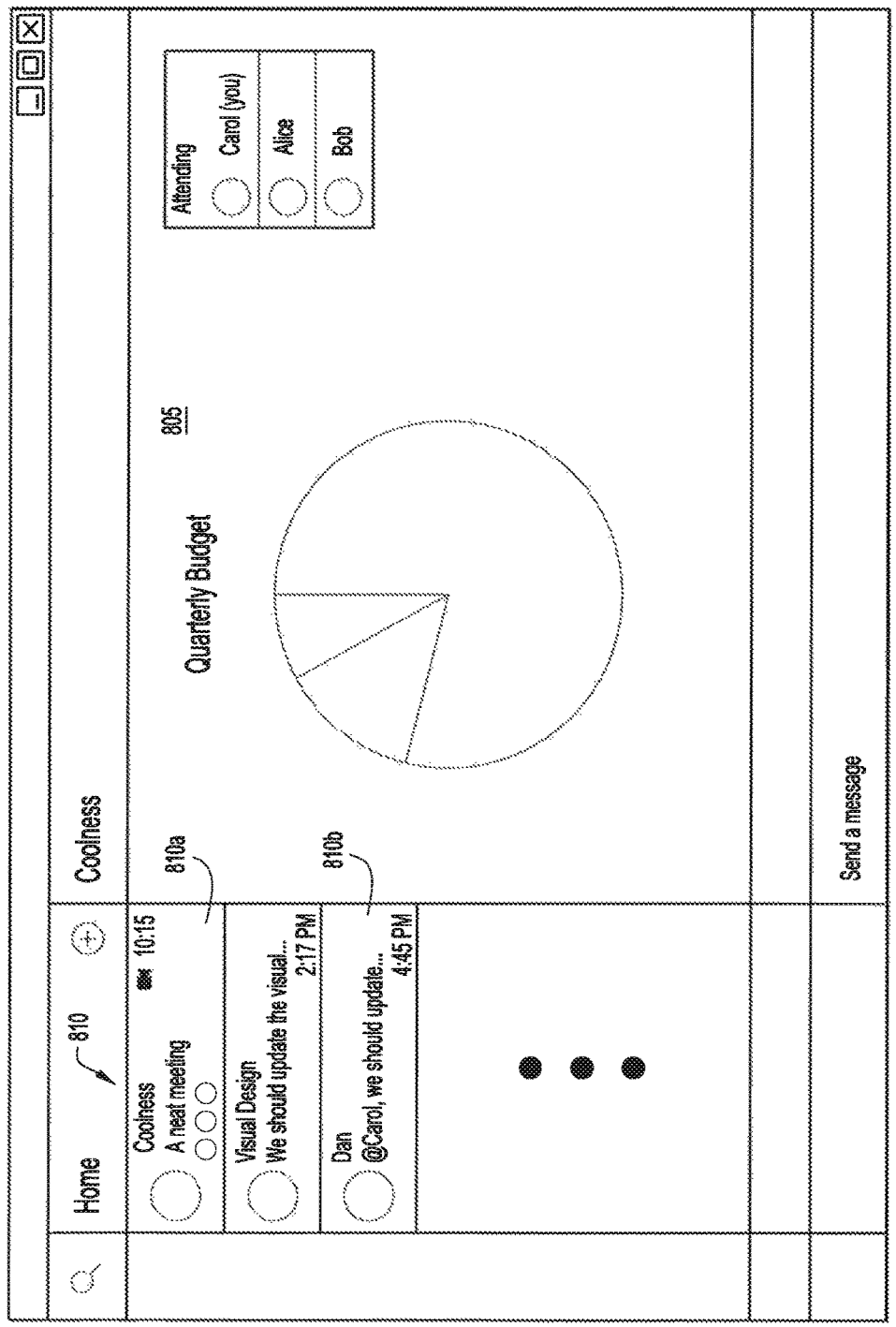
FIG. 8 is a user interface screen for a first user displayed/presented on a display of a first user device while the first user is using a chat application to add a second user to a communication session, according to an example embodiment.

With reference to FIG. 8, there is an example user interface screen 800 for first user Carol displayed/presented on a display of the first user device associated with/for Carol. The first user device for Carol is connected to the web-based meeting Coolness enabling Carol to participate in that meeting. User interface screen 800 includes a main display panel 805 (referred to simply as "panel" 805) that presents content being shared with other participants in the web-based meeting Coolness. User internee screen 800 also includes a series or column of smaller, user selectable, side panels 810 each to indicate, and linked to, a corresponding other web-based meeting or a corresponding chat application. In other words, side panels 810 represent a list of accessible web-based meetings, shared work spaces, chat rooms, chat sessions, etc. Side panels 810 include a topmost side panel 810a corresponding to the Coolness meeting, a side panel 810b corresponding to a chat room with second user Dan, and other side panels. Dan is not connected to/participating in the web-based meeting Coolness. Selection of one of side panels 810 by Carol activates that side panel and brings content from the corresponding web-based meeting or chat application into main panel 805. Currently, topmost side panel 810a corresponding to the Coolness meeting is selected, so content being shared in the Coolness meeting is displayed in main panel 805.

From her chat application, Carol selects the chat room for Dan. This establishes a 1:1 chat room/session for, or simply "chat" between, Carol and Dan, i.e., Carol and Dan are connected to the same chat room (i.e., their user devices are connected to the same chat room) so that they can have 1-1 chat/IM communications. Most chat applications have a user selectable user interface (UI) object, such as a UI "button," that, when selected by the user, provides a facility to "send some thing to a particular user." The UI object may be represented as a paperclip button, for example, which invokes a file selector or browser function. The UI object may include different selectable options, such as a field in which to enter text that to is to be transmitted, but may also include dedicated buttons for sending a document, a photo, using as camera to take a new photo, send an @mention, and even a "stickie" note.

Figure 9:
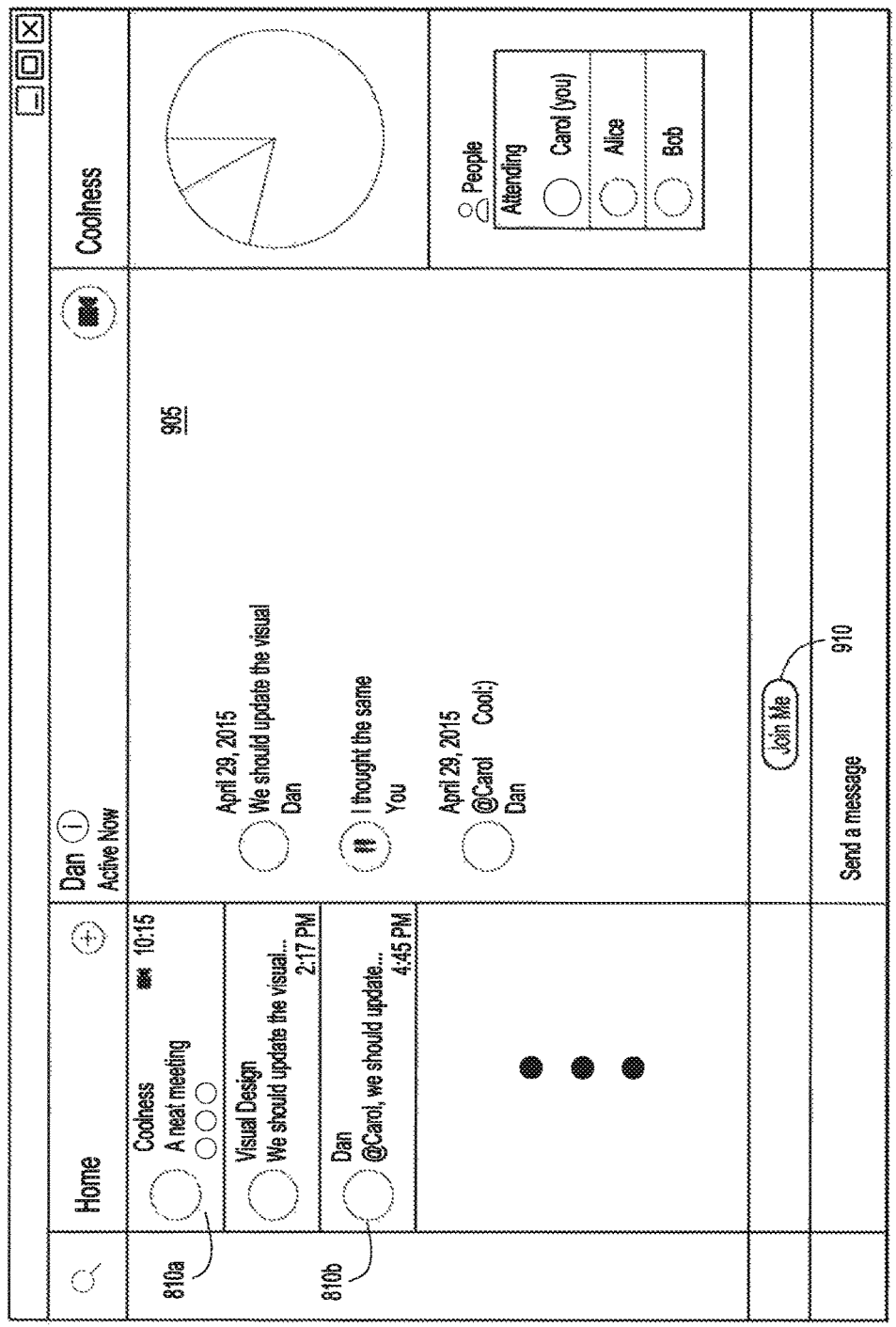
FIG. 9 is a user interface screen for the first user after the first user has selected to activate the chat application, according to an example embodiment.

With reference to FIG. 9, there is a user interface screen 900 for Carol (i.e., displayed on Carol's user device) after Carol has selected side panel 810b to activate the chat application with Dan, thus bringing chat session content between Carol and Dan into a main panel 905. In accordance this embodiment, Carol selected side panel 810b as an initial action in order to ultimately add Dan to the meeting Coolness. To that end, the chat application displays a user selectable join option 910, also referred to as a "join button," associated with a join link to on-going web-based meetings or calls in which Carol is participating. As will be described more fully below, when selected, join button 910 implements a "send join link." Thus, join button 910 is also referred to as a "send join link" button. join button 910 is present in the chat application only when Carol is participating in, or could be participating in, at least one web-based call or meeting, such as the Coolness meeting. When Carol is in the 1-1 chat with Dan, since a meeting is in progress, join button 910 is present on the user interface screen 900 for Carol.

Figure 10:
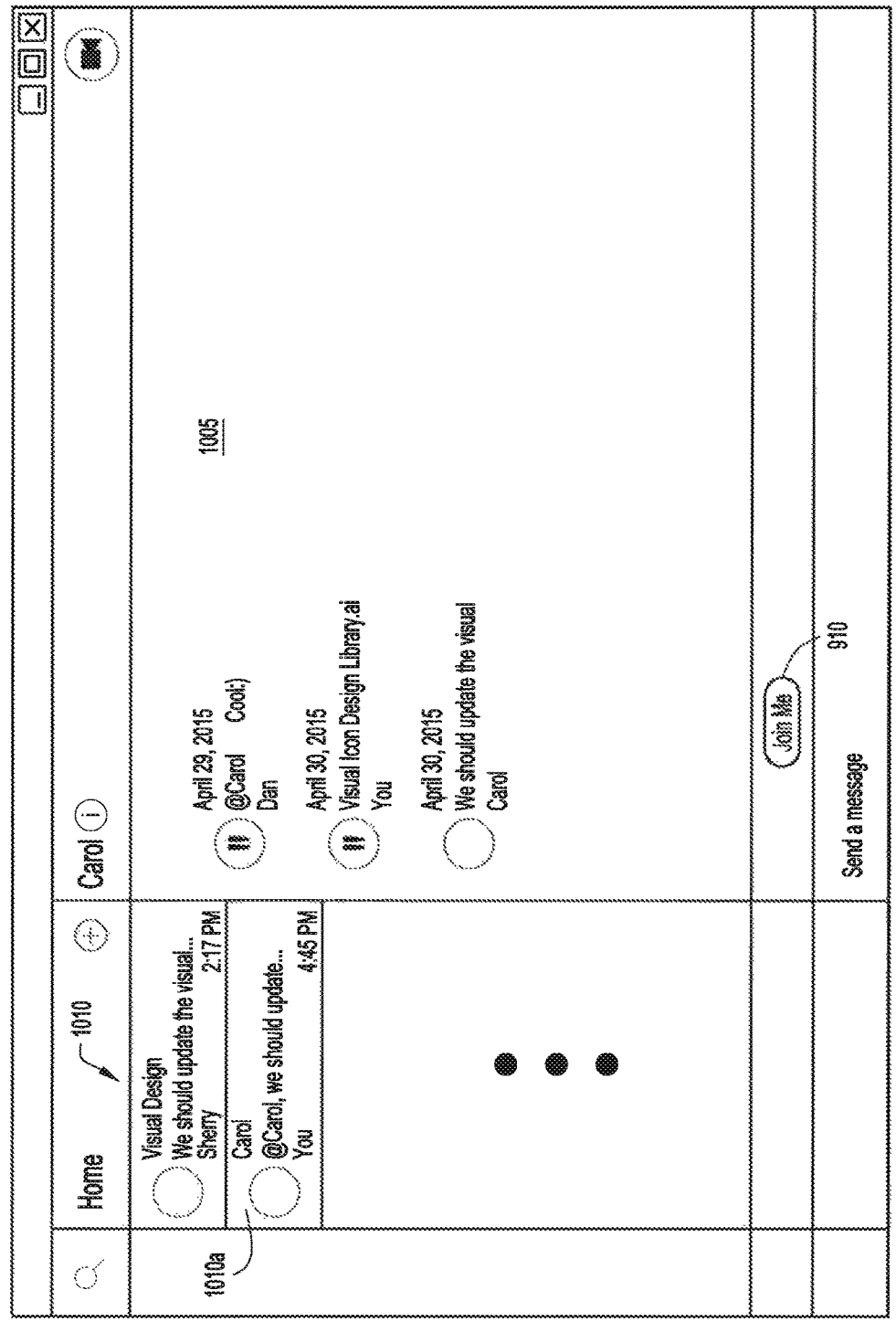
FIG. 10 is a user interface screen for the second user device after the first user has selected the second user in the chat application, according to an example embodiment.

With reference to FIG. 10, there is a user interface screen 1000 displayed/presented on a display of a second user device for/associated with Dan after Carol has selected the chat application for Dan. User interface screen 1000 includes a main panel 1005 and side panels 1010. Among side panels 1010, a side panel 1010a corresponding to the chat room shared between Dan and Carol is selected, which brings chat content shared with Carol into main panel 1005.

Returning to FIG. 9, assume Carol selects/clicks join button 910. This action causes a data object representative of the join button (or a message indicating the same) to be pasted into the chat message stream or activity stream between Carol and Dam The object representative of join button 910 is essentially an invitation "Join meeting <X>," where X is the subject or any other identifying information for the communication session in which Carol is participating, e.g., X=meeting Coolness. The object includes the join link pointing to the meeting to which Dan is to be added. Other identifying information may include identifiers of the communication session and of other users participating in the communication session.

Figure 11:
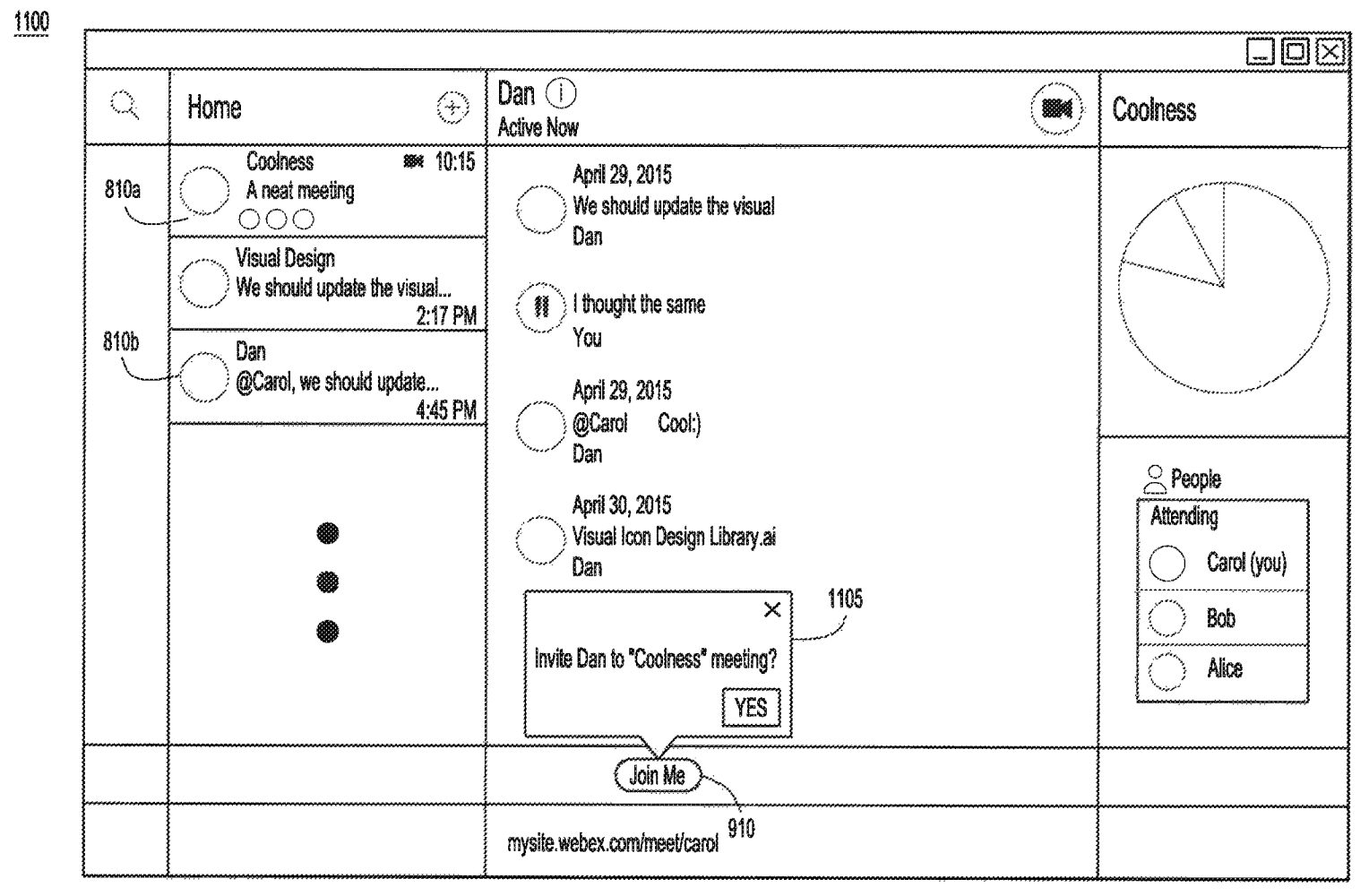

With reference to FIG. 11, there is a user interface screen 1100 for Carol after Carol has selected join button 910 to join Dan to the web-based meeting Coolness. The selection of join button 910 has surfaced a confirmatory prompt 1105 "Invite Dan to Coolness meeting?," requesting confirmation by Carol.

If Carol is in, or could be in, multiple communication sessions, responsive to the join button being selected, the chat application presents a dialog box (not shown in FIG. 12) that lists the multiple communication sessions in user selectable form, and allows Carol to select one or more of the listed communication sessions to which other users may be added. For example, if Carol was scheduled to be in web-based meeting X, and is in that web-based meeting but with muted audio, and separately placed a call to a user Zack, Carol is in two communication sessions, one for web-based meeting X and one for call with Zack. In this case, when Carol selects 1-1 chat with Dan and then selects the join button (i.e., selects the "send join link" button), Carol receives a dialog box with two options: "Send link to call with Zack" and "Send link to your web-based meeting."

Carol may select one of the options, and the resulting instance of the join button is placed into the chat activity stream.

Also, the join button is "smart" in that it is associated with an activity status of the communication session and is presented in a way that indicates such status, e.g., whether the communication session is active or inactive. For example, the join button may be presented as a "live" (i.e., user selectable) colored button in the chat application only while the communication session in progress is active. Once the communication session ends, the join button—in real-time—changes, and instead becomes a text description of what happened, e.g., "Carol asked you to join her 2 pm meeting."

Figure 12:
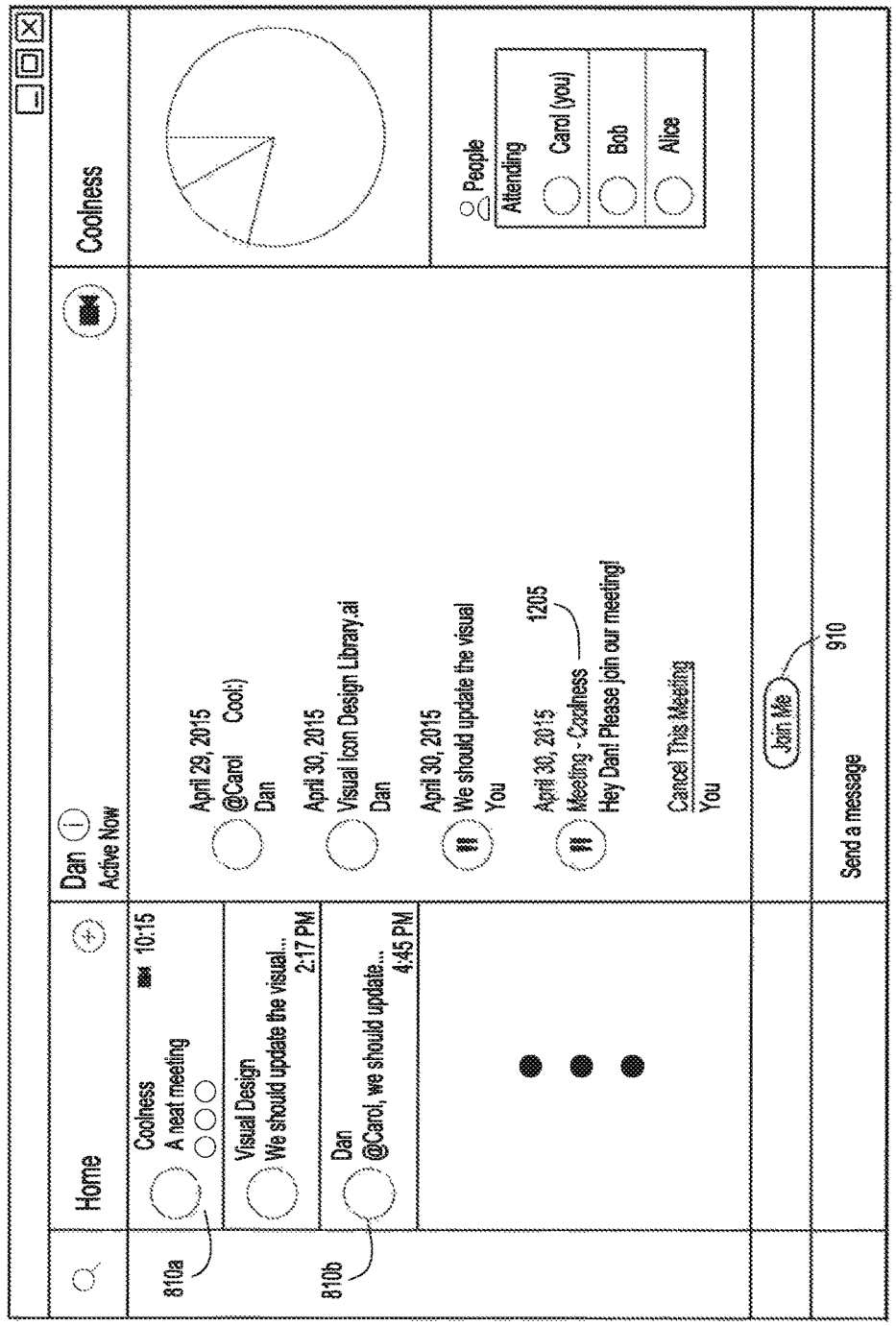
FIG. 12 is a user interface screen for the first user after the first user has confirmed selection of the join button, according to an example embodiment.

After Carol has selected the join button and confirmed the selection (and if Carol is in or could be in multiple communication sessions, and Carol selected the one to which Dan is to be added), Carol is presented with a confirmation, as shown in FIG. 12, for example.

With reference to FIG. 12, there is a user interface screen 1200 for Carol after Carol has confirmed selection of join button 910 to join Dan to the meeting Coolness. User interface screen 1200 includes a confirmation prompt 1205 (e.g., "Meeting—Coolness, Hey Dan! Please join our meeting!") to confirm that the join link and context information was sent to Dan.

Figure 13:
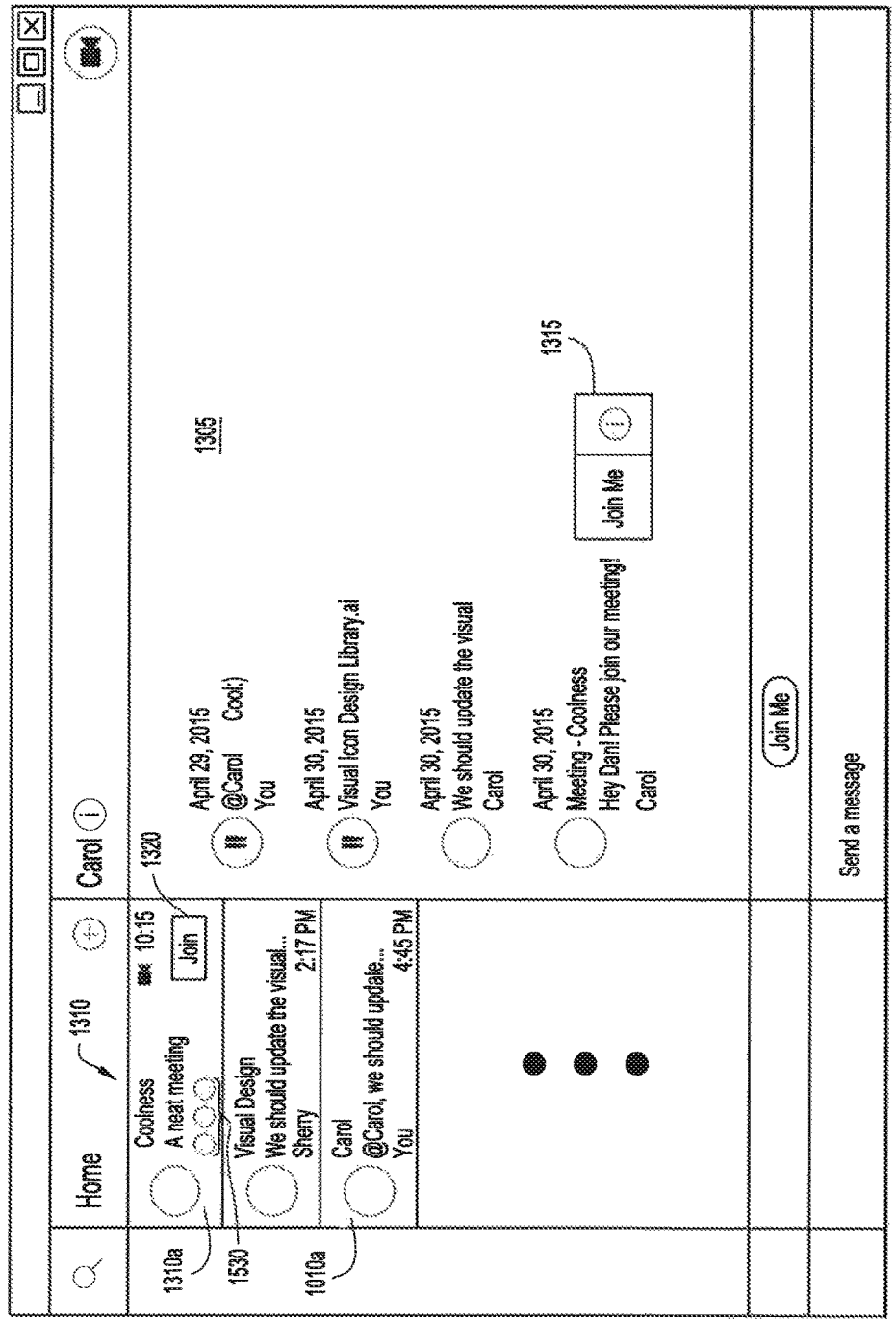
FIG. 13 is a user interface screen for the second user after the selected join option has been communicated to the second user, according to an example embodiment.

Once Carol has selected the join button, and the, object representative of the join button has been communicated through the chat application to Dan (in the 1-1 chat activity stream between Carol and Dan), the chat application for Dan interprets the received object as a join button and presents the join button on a chat screen for Dan in a user selectable form as shown in FIG. 13, for example.

With reference to FIG. 13, there is a user interface screen 1300 for Dan after the selected join option has been communicated to Dan via the chat application. User interface screen 1300 includes a main panel 1305 and side panels 1310. Side panels 1310 include a top panel 1310a corresponding to the meeting Coolness, and previously selected side panel 1010a shifted downward one panel from the topmost panel compared to user interface screen 1000 shown in FIG. 10. Main panel 1305 includes a join option 1315, and topmost side panel 1310a also includes a join option 1320. Main panel 1305 and top side panel 1310a may include the context information, such as identifiers and/or a subject for the meeting "Coolness," and identifiers of participants in that meeting. The participants may be displayed as their avatars 1530 in topmost side panel 1310a. Join options 1315 and 1320 are each associated with the join link to the web-based meeting Coolness. Selecting either of join options 1315 or 1320 will result in joining Dan to the web-based meeting Coolness, i.e., connecting the second user device to the meeting Coolness. In other words, Dan selects either join button to be added to the Coolness meeting. Dan can also monitor participation and even participate via chat with the other participants via the chat application.

Once the communication session ends, e.g., once the Coolness meeting ends, the corresponding room at the top of chat room/meeting list 1310 is removed.

This embodiment may also be used with calls. For example, assume user Carol has access to a cloud-based deskphone, or a premise-based deskphone. Carol places a call to Zack via the deskphone, and she is talking to Zack. Carol can, on her desktop collaboration application (e.g., Cisco Spark application), navigate to the 1-1 chat with Dan, which presents the join button on the chat screen. If Carol selects the join button, the object representative of the join button is pasted into the 1-1 chat activity stream with Dan, indicating, "Join Carol's call with Zack," The join button is live while Carol is still talking to Zack. Once Carol hangs-up, the join button is removed and replaced with a message "Carol asked you to join her call with Dan." If Dan selects the join button at his end of the chat, Dan is automatically added to the call and the display on the deskphone for Carol would indicate that she was in a conference call now. In essence, this allows a simple messaging-like flow to add someone to a deskphone call, without using a "coif" button. Also, Dan can join that call at any time when be is ready.

This embodiment may be used with embodiments described above in connection with the communication identifiers (i.e., zip identifiers) assigned to registered users of CSA service 120. This basically provides a UI front-end for the action of sending a communication identifier assigned to a first user (e.g., Carol) registered with CSA service 120 and engaged in a communication session to a second user (e.g., Dan) to be added/connected to communication session. However, in the easy-add embodiment, when there are multiple communication session in progress, the owner of the communication identifier (e.g., Carol) actively chooses to which of the web-based meetings/calls the selection of the join button refers/pertains. This adds the target user (e.g., Dan) as an authorized invitee to the invitee list bound to/associated with the communication identifier. When the target (e.g., Dan) selects the join button, there is no ambiguity about which communication session to join, in case there are more than one in progress. Unlike the above described communication identifier, which, taken alone, cannot resolve to a specific meeting definitively, this embodiment crates a "scoped" communication identifier responsive to user selection which points to a specific communication session. One purpose of the user interface overlay, however, is to avoid the need for a user to ever see communication identifiers, e.g., URLs. A result is that users may join/add other users to web-based calls simply by selecting join buttons presented in simple chat or other messaging applications.

This embodiment also presents a convenient learning technique for moving from communication identifiers to a join button approach. If a user does in fact paste or simply type his/her communication identifier into a 1-1 chat, and there is actually a communication session in progress, this action automatically surfaces a dialog box which asks the user: "to which meeting would you like to add the other user?" The user presented with the dialog box can either select a communication session or dismiss the action. Dismissing simply leaves the communication identifier in URL form. But selecting a communication session converts the communication identifier into a join button.

Figure 14:
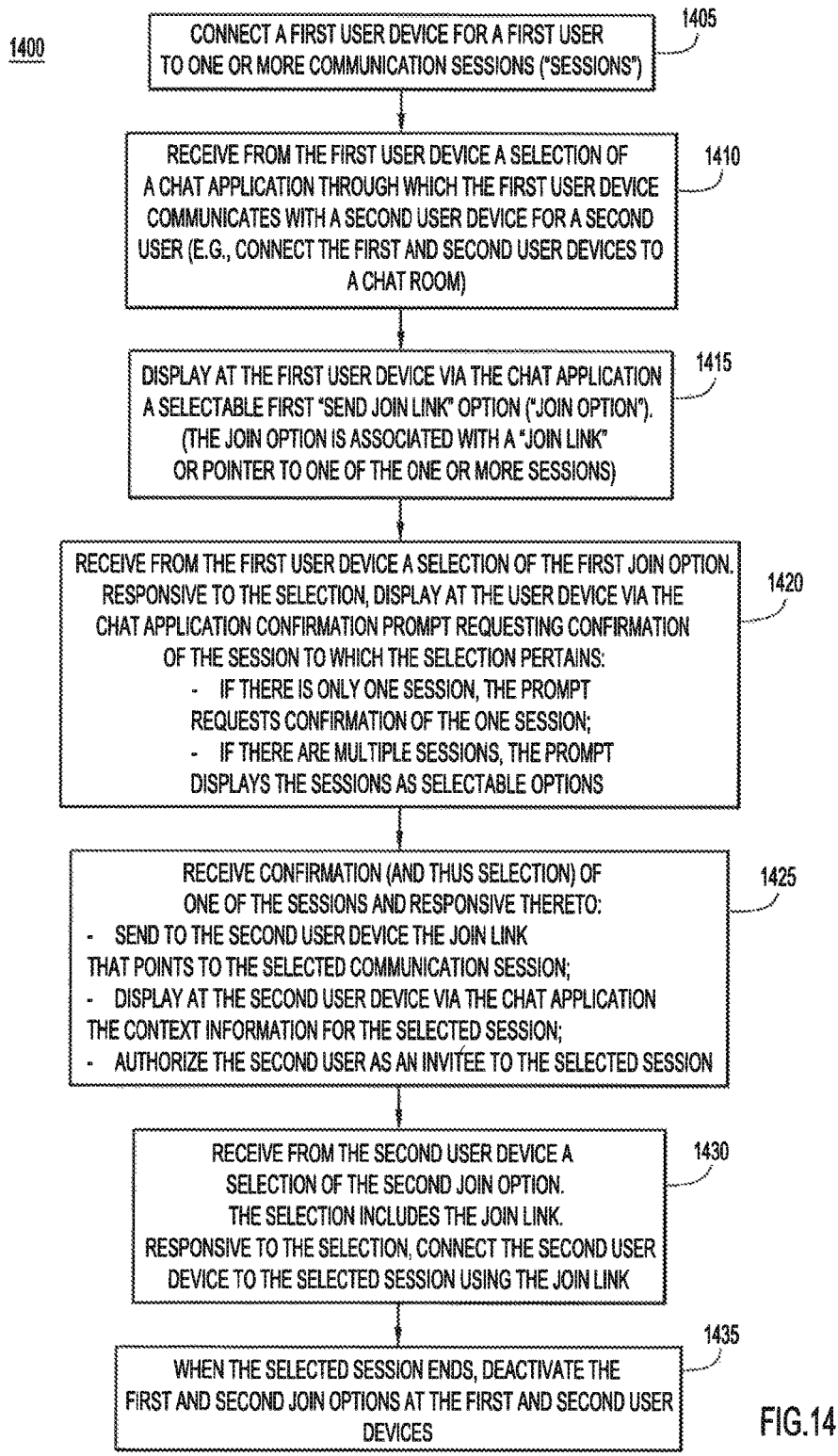
FIG. 14 is a flowchart of a method of adding a user to a communication session, according to an example embodiment.

With reference to FIG. 14, there is a flowchart of a method 1400 of adding a user to a communication session according to embodiment described herein in connection with FIGS. 8-13. Reference may also be made to FIG. 1 for purposes of this description of FIG. 14. The communication session may be a web-based meeting or a call. CSA 120 and chat service 124 (collectively referred to as "the Service" in the description of method 1400) cooperate to perform method 1400. In method 1400, chat service 124 communicates with CSA 120 and thus has access to information generated and accessed by the CSA, e.g., information in session mapping database 122. Chat service 124 leverages this information in method 1400.

At 1405, the Service connects a first user device associated with a first user to one or more communication sessions.

Thus, the first user is participating in the one or more communication sessions. This operation may be performed as described above or in accordance with any other suitable method for connecting a user device to a communication service. The one or more communication sessions are each associated with a join link or pointer to the one or more communication sessions. In a case with multiple communication sessions, there may be a respective join link to each of the communication sessions. In an example, the join link may include a communication identifier or other URL that points to the communication session, as described above.

At 1410, the first user selects a chat application in the Service through which the first user device communicates with a second user device associated with a second user. The chat application also generates chat screens for display at each of the first and second user devices.

At 1415, the Service generates for display at the first user device via the chat application a user selectable first "send join link" option ("join option"). The first join option may be represented as a join button in a user interface. The first user device displays the first join option.

At 1420, the Service receives from the first user device a selection of the first join option (which may be made by the first user at the first user device). Responsive to receiving the selection, the Service generates for display at the first user device a confirmatory prompt, requesting confirmation of the particular communication session to which the selection pertains. If the first user device is connected to only one communication session, the prompt requests confirmation of the one communication session. If the user device is connected to multiple sessions, the prompt presents the multiple sessions as user selectable options to enable the first user to select to which of the multiple sessions the second user is to be added/connected.

At 1425, when the first user confirms the selection at the first user device (e.g., the first user clicks on the confirmatory prompt or selects a communication session option, as appropriate), the Service receives the confirmation from the first user device. Responsive to receiving the confirmation (and thus selection of one of the communication sessions), the Service accesses (e.g., in session mapping database 122 shown in FIG. 1) the join link to, and context information for, the selected communication session. The context information may include an identifier/name for the selected communication session, if available, and identifiers of participants in, or invitees to, the selected communication session.

The Service sends the join link to the second user device. The Service also generates for display at the second user device via the chat application the context information and a user selectable second join option that is associated with the join link at the second user device. The Service adds the second user as an authorized invitee to the list of invitees (if there is one) to the selected communication session. The Service then generates for display at the first user device confirmation that the join link was sent.

The second user device receives the information including the join link, stores it, and displays the user selectable second join option and the context information. The second user device associates the second join option with the join link At 1430, the Service receives from the second user device a selection of the second join option (Which is made by the second user at the second user device). The selection includes the join link and represents a join request to join the selected communication session. The join request may also include an identifier of the second user, such as an email address of the second user. Responsive to receiving the selection, the Service connects the second user device to the selected communication using the join link. Because the second user is an authorized invitee to the selected communication session, the identifier of the second user need not be further verified. Also, neither the first nor the second user need be aware of the join link in the process of adding the second user to the communication sessions.

At 1435, when the selected communication session ends, the Service deactivates/disables the first and second join options at the first and second user devices. To do this, the join options may be removed or become unresponsive to selection thereof.

In summary, in accordance with this embodiment, when a user is in a communication session, his or her chat application surfaces an option to "send a join link." Clicking that option sends a live join link to the meeting/call the user is in. If the user is in more than one communication session, the user selects which one be/she wants to send a join link for. That join link is an active control in the chat application, live only for the duration of that call or meeting. Once the call/meeting ends, it becomes inactive. Similarly, pasting a communication identifier into a chat creates a dialog to select the target meeting and transforms the communication identifier into a join button.

Advantages of this embodiment include avoiding the need for users to know or access what URL to send another user to add that user to a call or meeting. As such, this embodiment has the advantages also offered by a collaboration meeting room (CMR) in that regard, in which it is easy to send a user a link to one's personal CMR via chat, but automates the process by sending the link with a single click of a join button, and renders context about what meeting is being joined. Furthermore, this embodiment allows the recipient of the URL associated with the join button to receive information about the meeting, as if the recipient were invited, before the recipient joins. The information includes other participants and a meeting subject. This embodiment also allows the join button sender and recipient to chat in the meeting before joining.

Figure 15:
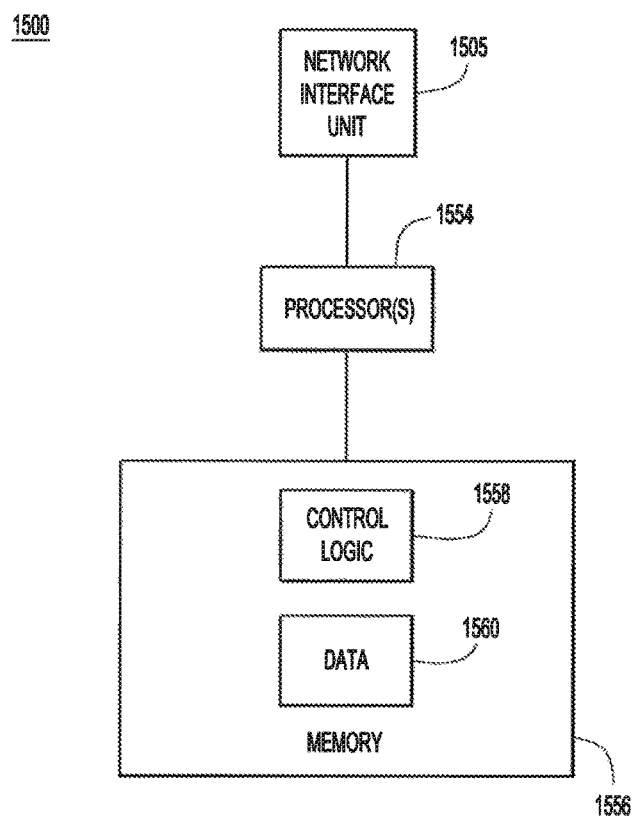
FIG. 15 is a block diagram of a computer system to host the communication session access service and/or chat service and perform the operations described herein, according to an example embodiment.

With reference to FIG. 15, there is a block diagram of an example computer device 1500 for hosting/implementing CSA service 120 or chat service 124. Computer device 1500 may represent CSA server 118 or chat server 123. Computer device 1500 includes network interface unit 1505 to communicate with a wired and/or wireless communication network so as to communicate with calendar service 106, call service 112, meeting service 116, CSA service 120/chat service 124 in the case where computer device represents chat server 123/CSA server 118, and client devices 102. Computer device 1500 also includes a processor 1554 (or multiple processors, which may be implemented as software or hardware processors), and memory 1556. Network interface unit 1505 may include an Ethernet card (or multiple such devices) to communicate over wired Ethernet links and/or a wireless communication card to communicate over wireless links.

Memory 1556 stores instructions for implementing methods described herein. Memory 1556 may include read only memory (ROM), random access memory (RAM), magnetic disk storage media devices, optical storage media devices, flash memory devices, electrical, optical, or other physical/tangible (non-transitory) memory storage devices. The processor 1554 is, for example, a microprocessor or a microcontroller that executes instructions stored in memory. Thus, in general, the memory 1556 may comprise one or more tangible computer readable storage media (e.g., a memory device) encoded with software comprising computer executable instructions and when the software is executed (by the processor 1554) it is operable to perform the operations described herein. Memory 1556 stores control logic 1558 to perform operations of CSA service 120 and/or chat service 124 described herein, so as to implement methods 200, 400, 500, 600, and 1400 for example. The memory 1556 may also store data 1560 used and generated by logic 1558, such as communication identifiers, personal identifiers, and information from session mapping database 122. Memory 1556 also stores associations or mappings between join options (buttons) and join links to communication sessions.

In summary, in one aspect, a method is provided comprising: at a server configured to provide a service that manages access to communication sessions supported by at least one communication service and to which user devices connect: assigning to users registered with the service respective communication identifiers that the users and unregistered users of the service use to access the communication sessions via user devices; mapping each communication identifier to a list of communication sessions, if any, in which the respective user is currently participating and/or is scheduled to participate; receiving from a user device a join request from a requester, the join request indicating a particular communication identifier of a particular user registered with the service and a requester identifier; and connecting the user device to a communication session, if any, based on the particular communication identifier and the requester identifier.

In another aspect, an apparatus is provided comprising a network interface unit to communicate with a network; and a processor coupled to the network interface unit and configured to provide a service that manages access to communication sessions supported by at least one communication service and to which user devices connect, wherein the processor is configured to: assign to users registered with the service respective communication identifiers that the users and unregistered users of the service use to access the communication sessions via user devices; map each communication identifier to a list of communication sessions, if any, in which the respective user is currently participating and/or is scheduled to participate; receive from a user device a join request from a requester, the join request indicating a particular communication identifier of a particular user registered with the service and a requester identifier; and connect the user device to a communication session, if any, based on the particular communication identifier and the requester identifier.

In yet another aspect a non-transitory tangible computer readable medium is provided. The computer readable medium has computer usable instructions stored thereon for execution by a processor, wherein the instructions, when executed by the processor, cause the processor to provide a service that manages access to communication sessions supported by at least one communication service and to which user devices connect, wherein the instructions to cause the processor to provide the service include instructions to cause the processor to: assign to users registered with the service respective communication identifiers that the users and unregistered users of the service use to access the communication sessions via user devices; map each communication identifier to a list of communication sessions, if any, in which the respective user is currently participating and/or is scheduled to participate; receive from a user device a join request from a requester, the join request indicating a particular communication identifier of a particular user registered with the service and a requester identifier; and connect the user device to a communication session, if any, based on the particular communication identifier and the requester identifier.

In another aspect, a computer-implemented method is provided comprising: at one or more servers configured to manage access to communication sessions supported by at least one communication service and to which user devices connect: connecting a first user device to a communication session associated with a join link to the communication session; generating for display at the first user device a selectable first join option associated with the join link; receiving a selection of the first join option and responsive thereto: sending to the second user device the join link; and generating for display at the second user device a selectable second join option associated with the join link; and receiving from the second user device a selection of the second join option and that includes the join link; responsive to the receiving the selection of the second join option, connecting the second user device to the communication session based on the join link.

The method may further comprise, after the receiving the selection of the first join option, authorizing the second user as an invitee to the communication session such that the connecting the second user device to the communication session may include connecting the second user device to the communication session based on the join link without verification of an identity of the second user.

In the method, the connecting the first user device may further include connecting the first user device to multiple communication sessions each associated with a respective join link to that communication session, and the method may further comprise:
  a. responsive to receiving the selection of the first join option, generating for display at the first user device options for selecting among the multiple communication sessions;
  b. responsive to receiving a selection of the one of the multiple communication sessions:
    i. the sending may include sending to the second user device the respective join link associated with the selected communication session; and
    ii. the generating may include generating for display at the second user device the second join option so as to be associated with the respective join link associated with the selected communication session.

The method may further comprise, when the communication session ends: disabling the first join option and the second join option at the first and second user devices, respectively.

The method may further comprise connecting the first user device and the second user device to a chat application hosted on the one or more servers and through which the first user device and the second user device communicate, wherein:
  a. the generating for display at the first user device the selectable first join option may include generating for display at the first user device a first chat screen that includes the first join option;
  b. the receiving the selection of the first join option may include receiving the selection via the first chat screen;
  c. the generating for display at the second user device the selectable second join option may include generating for display at the second user device a second chat screen that includes the second join option; and
  d. the receiving the selection of the second join option may include receiving the selection via the second chat screen.

The method may further comprise, responsive to the receiving the selection of the first join option, generating for display at the second user device context information associated with the communication session, the context information including invitees to the communication session and an identifier the communication session.

The communication session may be a web-based meeting or a voice call.

In yet another aspect, an apparatus is provided comprising: a network interface unit to communicate with a network; and a processor coupled to the network interface unit and configured to manage access to communication sessions supported by at least one communication service and to which user devices connect, wherein the processor is further configured to connect a first user device to a communication session associated with a join link to the communication session; generate for display at the first user device a selectable first join option associated with the join link; receive a selection of the first join option and responsive thereto: send to the second user device the join link; and generate for display at the second user device a selectable second join option associated with the join link; and receive from the second user device a selection of the second join option and that includes the join link; responsive to the receiving the selection of the second join option, connect the second user device to the communication session based on the join link.

In yet another aspect, a non-transitory tangible computer readable medium is provided. The computer readable medium stores instructions that, when executed by a processor associated with one or more servers configured to manage access to communication sessions supported by at least one communication service and to which user devices connect, cause the processor to: connect a first user device to a communication session associated with a join link to the communication session; generate for display at the first user device a selectable first join option associated with the join link; receive a selection of the first join option and responsive thereto: sending to the second user device the join link; and generating for display at the second user device a selectable second join option associated with the join link; and receive from the second user device a selection of the second join option and that includes the join link; responsive to the receiving the selection of the second join option, connect the second user device to the communication session based on the join link.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   at a server configured to provide a service that manages access to communication sessions supported by at least one communication service and to which user devices connect:
      assigning to users registered with the service respective communication identifiers that each indicate a respective user identifier of a user registered with the service and that the users and unregistered users of the service use to access the communication sessions via user devices;
      mapping each communication identifier to a list of communication sessions, if any, in which the respective user is currently participating and/or is scheduled to participate;
      receiving from a user device a join request from a requester, the join request indicating a particular communication identifier of a particular user registered with the service and a requester identifier;
      examining the list of communication sessions mapped to the particular communication identifier, and comparing the requester identifier to a particular user identifier indicated by the particular communication identifier; and
      based on the examining and the comparing, connecting the user device to a communication session, if any, based on the particular communication identifier and the requester identifier.

2. The method of claim 1, wherein the at least one communication service includes a voice call service configured to support voice calls and a web-based meeting service that supports web-based meetings.

3. The method of claim 1, wherein the requester identifier and the particular user identifier are email addresses.

4. The method of claim 1, wherein if the list of communication sessions is empty and the requester identifier matches the particular user identifier, further comprising creating a new communication session with the at least one communication service, and wherein connecting comprises connecting the user device to the new communication session.

5. The method of claim 1, wherein if the list of communication sessions is empty and the requester identifier does not match the particular user identifier, further comprising:
   presenting a prompt at a user device that is associated with the particular user, wherein the prompt is configured to seek approval of the join request; and
   upon receiving approval of the join request:
      creating a new communication session; and
      connecting the user device to the new communication session.

6. The method of claim 1, wherein:
   if the list of communication sessions includes only one communication session and the requester identifier matches the particular user identifier, the connecting includes connecting the user device to the communication session; and
   if the list includes only one communication session and the requester identifier does not match the particular user identifier, the connecting includes:
      accessing a list of invitees to the only one communication session;
      comparing the requester identifier against the list of invitees; and
      if the requester identifier is on the list of invitees, connecting the user device to the communication session.

7. The method of claim 1, wherein if the list of communication sessions includes multiple communication sessions, the connecting includes:
   accessing for each communication session a respective list of invitees to the communication session, if available;
   comparing the requester identifier against each accessed list of invitees;

if the requester identifier is only on one list of invitees, connecting the user device to the communication session associated with the one list of invitees.

8. The method of claim 7, wherein if the list of communication sessions includes multiple communication sessions and the requester identifier is on multiple accessed lists of invitees, the connecting includes:
   presenting a prompt at the user device as to which communication session among the multiple communication sessions the requester wishes to join;
   receiving from the user device a reply indicating a particular communication session among the multiple communication sessions; and
   responsive to the reply, connecting the user device to the particular communication session.

9. The method of claim 7, wherein if the list of communication sessions includes multiple communication sessions and the requester identifier is not on any accessed list of invitees, further comprising:
   presenting a prompt at a user device that is associated with the particular user, the prompt configured to seek selection of one of the multiple communication sessions;
   upon receiving a reply that indicates a selected one of the multiple communication sessions, connecting the user device to the selected one of the multiple communication sessions.

10. The method of claim 1, further comprising, at the server:
    receiving from the at least one communication service first information indicating the communication sessions in which the users are participating; and
    receiving from a calendar service second information indicating communication sessions in which the users are scheduled to participate and invitees to the communication sessions in which the users are scheduled to participate,
    wherein the mapping includes mapping each communication identifier to the respective list of communication sessions and associated invitees based on the received first information and second information.

11. The method of claim 10, wherein:
    the at least one communication service includes a voice call service configured to support voice calls and a web-based meeting service that supports web-based meetings; and
    the mapping includes mapping each communication identifier to the respective list of communication sessions including voice calls and web-based meetings.

12. The method of claim 1, wherein each communications identifier comprises a Uniform Resource Locator that points to the server and that indicates an identifier for the user to which the communication identifier is assigned.

13. An apparatus comprising:
    a network interface unit to communicate with a network; and
    a processor coupled to the network interface unit and configured to provide a service that manages access to communication sessions supported by at least one communication service and to which user devices connect, wherein the processor is configured to:
       assign to users registered with the service respective communication identifiers that each indicate a respective user identifier of a user registered with the service and that the users and unregistered users of the service use to access the communication sessions via user devices;
       map each communication identifier to a list of communication sessions, if any, in which the respective user is currently participating and/or is scheduled to participate;
       receive from a user device a join request from a requester, the join request indicating a particular communication identifier of a particular user registered with the service and a requester identifier;
       examine the list of communication sessions mapped to the particular communication identifier, and compare the requester identifier to a particular user identifier indicated by the particular communication identifier; and
       based on results of the examine and the compare operations, connect the user device to a communication session, if any, based on the particular communication identifier and the requester identifier.

14. The apparatus of claim 13, wherein the requester identifier and the particular user identifier are email addresses.

15. The apparatus of claim 13, wherein the processor is further configure to: if the list of communication sessions is empty and the requester identifier matches the particular user identifier, create a new communication session with the at least one communication service, and wherein the processor is further configured to connect by connecting the user device to the new communication session.

16. The apparatus of claim 13, wherein the processor is further configured to: if the list of communication sessions is empty and the requester identifier does not match the particular user identifier:
    present a prompt at a user device that is associated with the particular user, wherein the prompt is configured to seek approval of the join request; and
    upon receiving approval of the join request:
       create a new communication session; and
       connect the user device to the new communication session.

17. The apparatus of claim 13, wherein the processor is further configured to:
    if the list of communication sessions includes only one communication session and the requester identifier matches the particular user identifier, connect the user device to the communication session; and
    if the list includes only one communication session and the requester identifier does not match the particular user identifier:
       access a list of invitees to the only one communication session;
       compare the requester identifier against the list of invitees; and
       if the requester identifier is on the list of invitees, connect the user device to the communication session.

18. The apparatus of claim 13, wherein the processor is further configured to: if the list of communication sessions includes multiple communication sessions:
    access for each communication session a respective list of invitees to the communication session, if available;
    compare the requester identifier against each accessed list of invitees;
    if the requester identifier is only on one list of invitees, connect the user device to the communication session associated with the one list of invitees.

19. The apparatus of claim 13, wherein:
the at least one communication service includes a voice call service configured to support voice calls and a web-based meeting service that supports web-based meetings; and
the processor is configured to map by mapping each communication identifier to the respective list of communication sessions including voice calls and web-based meetings.

20. A non-transitory computer readable medium having computer usable instructions stored thereon for execution by a processor, wherein the instructions, when executed by the processor, cause the processor to provide a service that manages access to communication sessions supported by at least one communication service and to which user devices connect, wherein the instructions to cause the processor to provide the service include instructions to cause the processor to:
assign to users registered with the service respective communication identifiers that the users and unregistered users of the service use to access the communication sessions via user devices;
receive from the at least one communication service first information indicating the communication sessions in which the users are participating, and receive from a calendar service second information indicating communication sessions in which the users are scheduled to participate and invitees to the communication sessions in which the users are scheduled to participate
map each communication identifier to a list of communication sessions, if any, in which the respective user is currently participating and/or is scheduled to participate and associated invitees based on the received first information and second information;
receive from a user device a join request from a requester, the join request indicating a particular communication identifier of a particular user registered with the service and a requester identifier; and
connect the user device to a communication session, if any, based on the particular communication identifier and the requester identifier.

21. The non-transitory computer readable medium of claim 20, wherein each communication identifier indicates a respective user identifier of a user registered with the service, and the instructions further comprise instructions to cause the processor to:
examine the list of communication sessions mapped to the particular communication identifier; and
compare the requester identifier to a particular user identifier indicated by the particular communication identifier,
wherein the instructions to cause the processor to connect includes instructions to cause the processor to connect the user device to the communication session based on results of the examine and the compare operations.

22. The non-transitory computer readable medium of claim 21,
wherein the requester identifier and the particular user identifier are email addresses.

23. The non-transitory computer readable medium of claim 20, wherein:
the at least one communication service includes a voice call service configured to support voice calls and a web-based meeting service that supports web-based meetings; and
the instruction to cause the processor to map include instructions to cause the processor to map each communication identifier to the respective list of communication sessions including voice calls and web-based meetings.

* * * * *

UNITED STATES PATENT AND TRADEMARK OFFICE
CERTIFICATE OF CORRECTION

PATENT NO. : 10,320,856 B2
APPLICATION NO. : 15/286755
DATED : June 11, 2019
INVENTOR(S) : Jonathan Rosenberg et al.

Page 1 of 1

It is certified that error appears in the above-identified patent and that said Letters Patent is hereby corrected as shown below:

In the Claims

Claim 20, Column 25, Line 29, please replace "participate" with --participate;--

Signed and Sealed this
Sixteenth Day of July, 2019

Andrei Iancu
*Director of the United States Patent and Trademark Office*